United States Patent
Gotoh et al.

(10) Patent No.: US 7,571,289 B2
(45) Date of Patent: Aug. 4, 2009

(54) DISK ARRAY DEVICE AND RESERVATION CANCELLATION CONTROL METHOD FOR DISK ARRAY DEVICE

(75) Inventors: Youichi Gotoh, Odawara (JP); Takeshi Ido, Odawara (JP); Katsuhiro Uchiumi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 474 days.

(21) Appl. No.: 10/866,041

(22) Filed: Jun. 14, 2004

(65) Prior Publication Data

US 2005/0228946 A1  Oct. 13, 2005

(30) Foreign Application Priority Data

Apr. 12, 2004  (JP)  ............... 2004-116360

(51) Int. Cl.
*G06F 13/10*  (2006.01)
(52) U.S. Cl. .................. 711/154; 711/114; 711/147; 711/152; 711/156; 711/170
(58) Field of Classification Search .................. 711/111, 711/114, 163, 152, 147, 154, 156, 170
See application file for complete search history.

(56) References Cited

U.S. PATENT DOCUMENTS

| 5,890,204 | A | * | 3/1999 | Ofer et al. | 711/111 |
|---|---|---|---|---|---|
| 5,892,955 | A | * | 4/1999 | Ofer | 710/200 |
| 6,105,085 | A | * | 8/2000 | Farley | 710/41 |
| 6,275,907 | B1 | | 8/2001 | Baumgartner et al. | |
| 6,304,980 | B1 | | 10/2001 | Beardsley et al. | |
| 6,490,659 | B1 | | 12/2002 | McKean et al. | |
| 6,574,589 | B1 | * | 6/2003 | Shoyama | 703/25 |
| 6,816,945 | B2 | | 11/2004 | Harris et al. | |
| 7,171,581 | B2 | * | 1/2007 | Wu | 714/4 |

(Continued)

FOREIGN PATENT DOCUMENTS

JP  05189396  7/1993

OTHER PUBLICATIONS

"SCSI Device IDs" Apr. 17, 2001. Retrieved from http://www.pcguide.com/ref/hdd/if/scsi/conflDs-c.html on Jan. 8, 2007.*
"Webopedia definition of failover" Jul. 17, 2001. Retrieved from http://www.webopedia.com/TERM/F/failover.html as archived by http://web.archive.org on Jan. 8, 2007.*

(Continued)

*Primary Examiner*—Tuan V Thai
*Assistant Examiner*—Yong Choe
(74) *Attorney, Agent, or Firm*—Brundidge & Stanger, P.C.

(57) ABSTRACT

The present invention allows a reserved state that prevails for an LDEV as a result of a host undergoing a system shutdown or the like to be confirmed and cancelled easily. The server 1 reserves the LDEV 4 and uses same exclusively. When the server 1 undergoes a system shutdown due to a fault or similar (S1), the LDEV 4 then remains reserved (S2). The server 2 is therefore unable to access the LDEV 4. The system administrator reads exclusive control information 6 in the memory 5 via the management terminal 7, and is thus able to display the reserved states of respective LDEVs on a terminal screen and confirm these states. The user then issues an instruction to cancel a reserved state from the management terminal 7 (S3). The disk array device 3 receives the cancellation instruction, and then cancels the reserved state by partially rewriting the exclusive control information 6.

20 Claims, 21 Drawing Sheets

U.S. PATENT DOCUMENTS

2002/0133735 A1 9/2002 McKean et al.
2003/0188108 A1 10/2003 Damron et al.
2004/0226021 A1* 11/2004 Miki et al. .................. 719/313

OTHER PUBLICATIONS

Kallhof, Larry. "How to use the network as a storage device." Feb. 9, 1998. Retrieved from http://www.networkworld.com/archive/1998/98153.htm on May 17, 2007.*

* cited by examiner

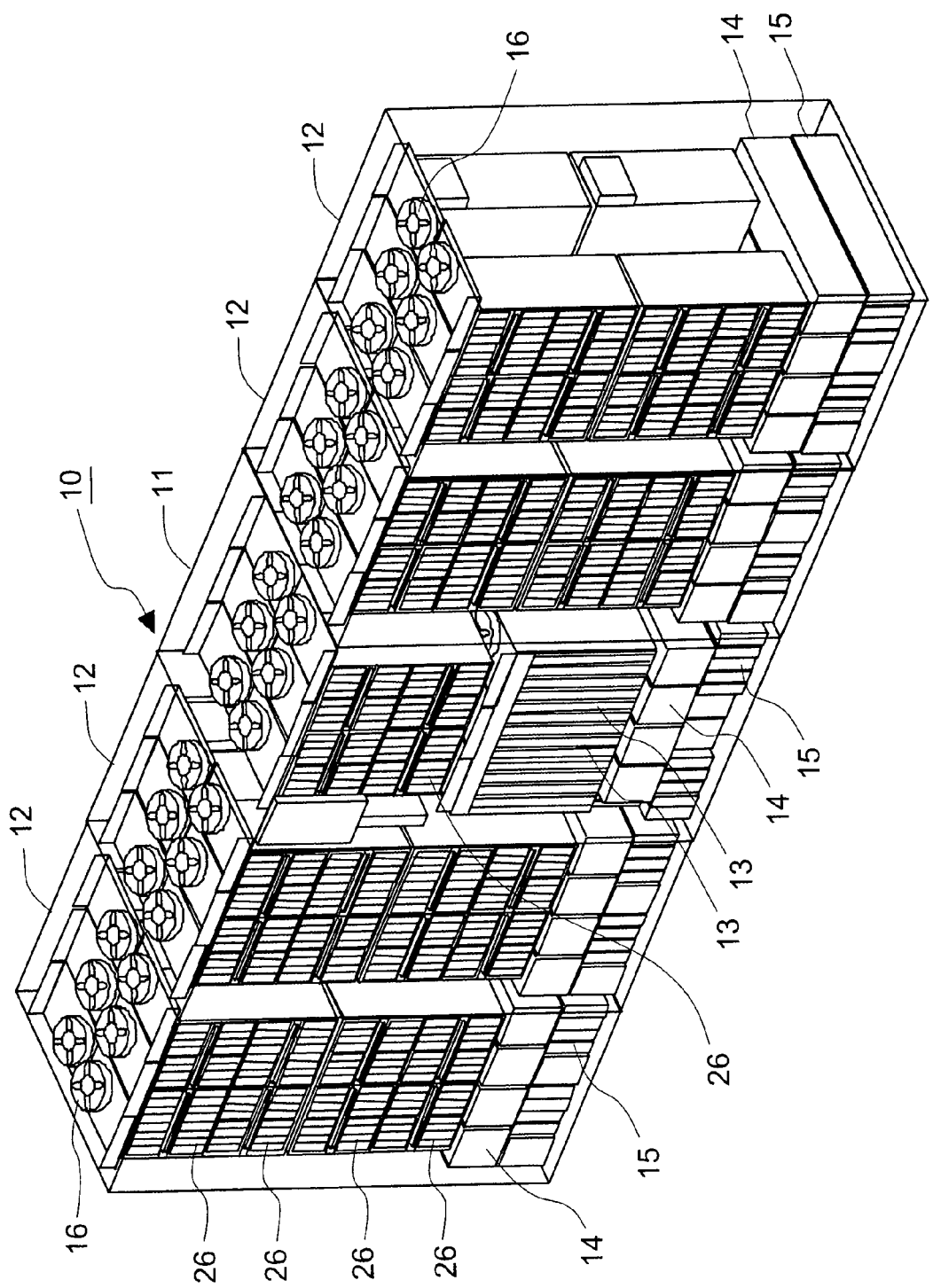

FIG. 6

| PORT-LUN CONSTITUTION INFORMATION | | | | T1 |
|---|---|---|---|---|
| # | PORT | LUN | LDEV | |
| 1 | 1 | 0 | 0000 | |
| 2 | | 1 | 0001 | |
| 3 | | 2 | 0002 | |
| 4 | 2 | 0 | 0004 | |
| 5 | | 1 | 0001 | |
| ⋮ | ⋮ | ⋮ | ⋮ | |

LDEV EXCLUSIVE CONTROL INFORMATION (LDCB)

| # | PORT | LUN | LDEV | RESERVED STATE | PATH INFORMATION | PERSISTENT RESERVED STATE | PATH INFORMATION | ACA STATE | PATH INFORMATION | UA STATE |
|---|------|-----|------|----------------|------------------|---------------------------|------------------|-----------|------------------|----------|
| 1 | 1 | 0 | 0000 | YES | PORT NUMBER/ WWN | - | - | - | - | - |
| 2 | 1 | 1 | 0001 | YES | PORT NUMBER/ WWN | - | - | - | - | - |
| 3 | 1 | 2 | 0002 | NO | - | - | - | - | - | - |
| 4 | 2 | 0 | 0004 | NO | - | - | - | - | - | - |
| 5 | 2 | 1 | 0001 | YES | PORT NUMBER/ WWN | - | - | - | - | - |
| ... | ... | ... | ... | ... | ... | ... | ... | ... | ... | ... |

LDEV EXCLUSIVE CONTROL INFORMATION (LDCB)

| # | PORT | LUN | LDEV | RESERVED STATE | PATH INFORMATION | PERSISTENT RESERVED STATE | PATH INFORMATION | ACA STATE | PATH INFORMATION | UA STATE | ACCESS PRIORITY |
|---|------|-----|------|----------------|------------------|---------------------------|------------------|-----------|------------------|----------|-----------------|
| 1 | 1 | 0 | 0000 | YES | PORT NUMBER/ WWN | - | - | - | - | - | - |
| 2 | 1 | 1 | 0001 | YES | PORT NUMBER/ WWN | - | - | - | - | - | HIGH |
| 3 | 1 | 2 | 0002 | NO | - | - | - | - | - | - | - |
| 4 | 2 | 0 | 0004 | NO | - | - | - | - | - | - | - |
| 5 | 2 | 1 | 0001 | YES | PORT NUMBER/ WWN | - | - | - | - | - | - |
| ... | ... | ... | ... | ... | ... | ... | ... | ... | ... | ... | ... |

FIG. 21

PORT-LUN CONSTITUTION INFORMATION

T1A

| # | PORT | LUN | LDEV | PATH INFORMATION FOR EXTERNAL VOLUME |
|---|------|-----|------|---------------------------------------|
| 1 | 1 | 0 | 0000 | - |
| 2 | 1 | 1 | 0001 | PORT NAME/ WWN |
| 3 | 1 | 2 | 0002 | - |
| 4 | 2 | 0 | 0004 | - |
| 5 | 2 | 1 | 0001 | PORT NAME/ WWN |
| ⋮ | ⋮ | ⋮ | ⋮ | ⋮ |

DISK ARRAY DEVICE AND RESERVATION CANCELLATION CONTROL METHOD FOR DISK ARRAY DEVICE

CROSS-REFERENCE TO RELATED APPLICATIONS

This application relates to and claims priority from Japanese Patent Application No. 2004-116360 filed on Apr. 12, 2004, the entire disclosure of which is incorporated herein by reference.

BACKGROUND OF THE INVENTION

The present invention relates to a disk array device and a reservation cancellation control method for the disk array device.

For example, in a variety of organizations such as companies, self-governing bodies, or schools, a variety of data of different types is managed in large volumes. These large volumes of data are managed by a storage system formed as a separate entity from a host computer. The storage system is constituted comprising at least one or more storage devices such as a disk array device, for example.

The disk array device is constituted having storage devices such as hard disk drives and semiconductor memory devices and so forth provided in the form of an array, for example. The disk array device supplies logical storage regions based on RAID (Redundant Array of Independent Inexpensive Disks). The logical storage regions are also called 'logical volumes' (LU: Logical Unit).

Further, the host computer accesses a logical volume via a communication port of the disk array device, and thus performs data reading/writing (I/O). In order to maintain data conformity and so forth, the host computer sometimes reserves a logical volume and uses the logical volume exclusively. When usage of the logical volume ends, the host computer cancels the reserved state.

Here, in cases where there is a fault with the host computer of any kind in a state where the logical volume has been reserved by the host computer, there is the possibility of the host computer undergoing a system fault in a condition where the reserved state has still not been cancelled. In such a case, another host computer is unable to use a logical volume that is still placed in a reserved state. Therefore, for example, the power supply of the disk array device is shut off, the cable connected to the communication port is disconnected, and the power supply of the channel switch connected to the disk array device is shut off, whereby reset processing is performed and the reserved state is cancelled.

A technology according to which, when a host whose disk device is reserved hangs up, a response confirmation is performed between a disk control device and the host, and, in cases where there is no response from the host, the reserved state is forcibly cancelled, is known (Japanese Patent Application Laid Open No. 5-189396).

When reset processing is performed by shutting off the power supply of the disk array device in order to cancel the reserved state of the logical volume, the host computer is unable to utilize storage services until the disk array device is restarted. Further, in cases where reset processing is performed by shutting off the power supply of the channel switch and disconnecting the cable connected to the communication port, another host computer is then unable to access another logical volume via the port that has been reset.

In recent years, in keeping with the increased performance and higher capacities of disk array devices, there have been frequent cases of disk array devices being used by a multiplicity of host computers. A plurality of logical volumes can each be associated with a plurality of respective communication ports that a disk array device comprises. Therefore, when the communication port is reset in order to cancel the reserved state that still remains for a logical volume, it is also no longer possible to access another logical volume associated with the communication port.

Further, when a communication port is reset by a disk array device and a reserved state that remains for a logical volume is canceled, another host computer is unable to identify the fact that the reserved state has been cancelled. Therefore, there is also the risk of a discrepancy in identification relating to the presence or absence of a reserved state between the disk array device and a multiplicity of host computers.

Further, the technology described in Japanese Patent Application Laid Open No. 5-189396 cancels the reserved state of a disk device but is unable to cancel the reserved state for a logical volume that is provided on the disk device. Therefore, the conventional technology cannot be applied to a system in which a logical volume is reserved and accessed.

SUMMARY OF THE INVENTION

The present invention was conceived in view of the above problems, an object thereof being to provide a disk array device and a reservation cancellation control method for the disk array device in which an exclusive usage state can be canceled in logical volume units. An object of the present invention is to provide a disk array device and a reservation cancellation control method for the disk array device that allows an exclusive usage state to be confirmed in logical volume units and allows exclusive usage to be cancelled in logical volume units. An object of the present invention is to provide a disk array device and a reservation cancellation control method for the disk array device that allows a reserved state to be cancelled in logical volume units based on the access priority. Further objects of the present invention will become evident from the following description of the embodiment.

BRIEF DESCRIPTION OF THE DRAWINGS

FIG. 2 is an external view of a disk array device that can be used by the present invention;

FIG. 6 is an explanatory view of port-LUN constitution information;

FIG. 7 is an explanatory view of an LDCB for controlling LDEV states;

FIG. 16 is an explanatory view of the constitution of the LDCB;

FIG. 21 is an explanatory view of port-LUN constitution information.

DESCRIPTION OF THE SPECIFIC EMBODIMENTS

Figure 1A:
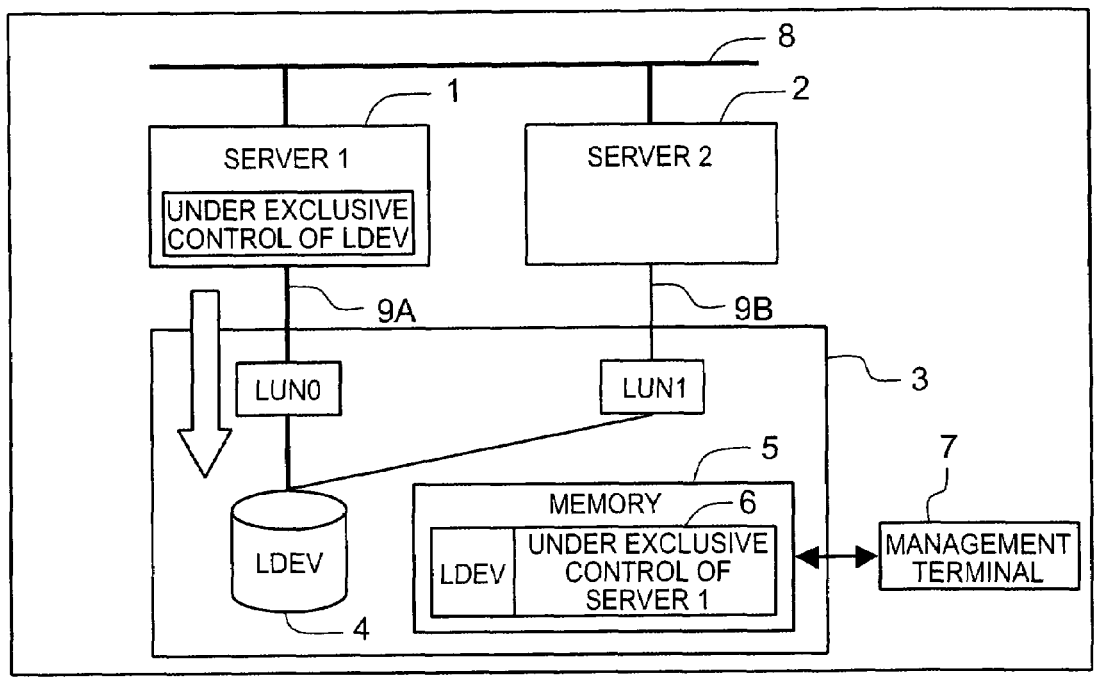
FIG. 1 is an explanatory view of the overall concept of the embodiment of the present invention.

In order to resolve the above object, the disk array device of the present invention comprises an upper-level interface control unit that controls the exchange of data with a plurality of host devices respectively via a communication port; a lower-level interface control unit that controls the exchange of data with a storage device; a memory portion that is shared by the upper-level interface control unit and the lower-level interface control unit; a logical volume provided on the storage device that can be accessed via the communication port; an exclusive control information storage region that stores exclusive control information for exclusive usage of the logical volume via the communication port by any one of the respective host devices; an exclusive control unit provided in the upper-level interface control unit that executes exclusive control of the logical volume on the basis of the exclusive control information; and a cancellation control unit, which, upon detecting a cancellation instruction, cancels the exclusive usage of the logical volume by updating the exclusive control information.

Possible examples of exclusive usage of a logical volume include that based on a reservation command issued by the host device, for example. In addition, logical-volume exclusive usage can also include an access infeasibility state caused by an error or the like. A plurality of host devices can constitute a failover cluster. A logical volume need not necessarily exist within a disk array device, and may instead exist in another external disk array device. Further, in cases where the host device is a so-called open-system computer device, the host device does not directly recognize the logical volume, same being recognized indirectly via a LUN. When the host computer is a so-called mainframe-system computer device, the host device directly recognizes logical volumes.

The exclusive control information storage region can be provided in at least either the memory portion or the upper-level interface control unit.

The cancellation control unit can be provided in the upper-level interface control unit. Further, when the exclusive control information is provided in either the memory portion or the lower-level interface control unit, the cancellation control unit can also be provided in the lower-level interface control unit.

A plurality of logical volumes is provided and the plurality of logical volumes can be associated with the communication port. That is, a plurality of logical volumes can each be connected to one communication port.

A display unit that displays predetermined information relating to the exclusive usage of the logical volume on the basis of all or part of the exclusive control information can also be provided.

A cancellation target selection unit that supplies the cancellation instruction to the cancellation control unit on the basis of the predetermined information displayed by the display unit can also be provided.

A priority management information storage region that stores priority management information for managing the priority of each of the host devices, and a priority judgment unit, which, in cases where a host device with a relatively low priority is exclusively using the logical volume, supplies the cancellation instruction to the cancellation control unit when a host device with a relatively high priority requests access to the logical volume, can also be provided.

The cancellation control unit is also able to report a change in the state of the logical volume to each of the host devices when exclusive usage of the logical volume is cancelled.

The disk array device and reservation cancellation control method for the disk array device according to the present invention can be constituted at least in part by a computer program. Further, the computer program can be distributed via a storage medium such as a hard disk, semiconductor memory, or optical disk, for example. Alternatively, the computer program can also be distributed via a communication network such as the Internet.

The embodiment of the present invention will be described hereinbelow based on the drawings. More details will be provided subsequently, but, in this embodiment, a disk array device is disclosed that comprises an upper-level interface control unit that controls the exchange of data with a plurality of host devices respectively via a communication port; a lower-level interface control unit that controls the exchange of data with a storage device; a memory portion that is shared by the upper-level interface control unit and the lower-level interface control unit; a logical volume provided on the storage device that can be accessed via the communication port; and a reservation information storage region that stores reservation information for the reservation and usage of the logical volume via the communication port by any one of the respective host devices. Further, in relation to this embodiment, there is proposed a reservation cancellation control method for a disk array device comprising a cancellation instruction generation step that generates a cancellation instruction for a logical volume, and a reservation cancellation step that cancels a reserved state by updating the reservation information when the cancellation instruction is generated.

FIG. 1 is an explanatory view of the overall concept of this embodiment. The storage system comprises a plurality of servers 1, 2, and a disk array device 3 used by these servers 1 and 2. The disk array device 3 can comprise at least one or more logical volumes (written as 'LDEV' in the drawings) 4, and a memory 5. Information 6 for the exclusive control of the logical volume 4 is stored in the memory 5. A management terminal 7 is connected to the disk array device 3.

Servers 1 and 2 are connected via a communication network 8 such as a LAN (Local Area Network), for example. Servers 1 and 2, and the disk array device 3 are connected via communication networks 9A and 9B such as a SAN (Storage Area Network), for example.

As a result of the server 1 issuing a reservation command containing information for specifying the logical volume 4, for example, the logical volume 4 is placed in the reserved state and can be used exclusively. During the interval in which the server 1 has reserved the logical volume 4, the server 2 is unable to access the logical volume 4. The reservation of the logical volume 4 by the server 1 is stored in the exclusive control information 6. In FIG. 1, the server 1 accesses the logical volume 4 via a LUN (Logical Unit Number) 0. Further, when the logical volume 4 cannot be reserved by the server 1, the server 2 is able to access the logical volume 4 via a LUN 1.

Figure 1B:
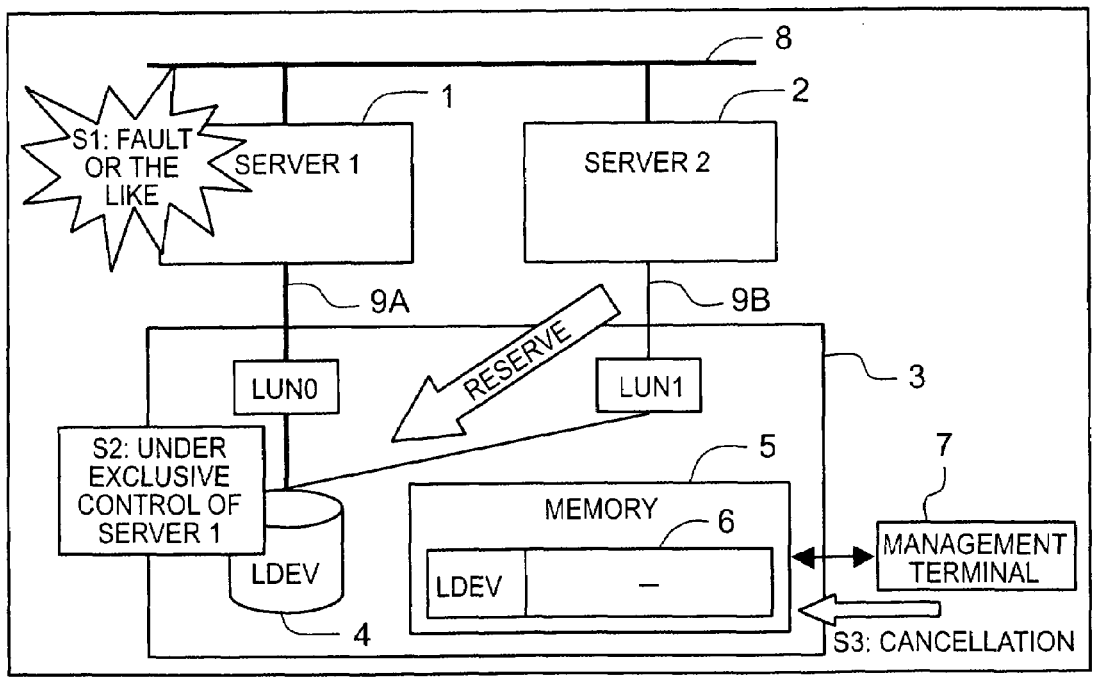

In FIG. 1(a), the server 1 reserves and uses the logical volume 4. Suppose that, as shown in FIG. 1(b), a fault occurs with the server 1 (S1) in a state where the server 1 has reserved the logical volume 4. Because it has not been possible to cancel the reserved state of the logical volume 4 (S2), the server 2 is unable to access the logical volume 4.

The system administrator issues an instruction to cancel the reserved state via the management terminal 7 (S3). The disk array device 3 then updates the exclusive control information 6 by forcibly removing the reservation by the server 1. As a result, the server 2 is able to access the logical volume 4. Here, information indicating that the logical volume 4 is in an unreserved state is set as the exclusive control information 6. By using the exclusive control information 6, the fact that the logical volume 4 has not been reserved can be reported to the server 2.

1. First Embodiment Example

First of all, an example of a disk array device will be described on the basis of FIGS. 2 and 3 and then the specific constitution of the present invention will be described with reference to FIG. 4 and subsequent figures.

FIG. 2 is a schematic conceptual view of the external constitution of a disk array device 10. The disk array device 10 can be constituted by a basic enclosure 11 and a plurality of additional enclosures 12, for example.

The basic enclosure 11 is the smallest constitutional unit of the disk array device 10 and possesses both a storage capacity and a control capacity. The additional enclosures 12 are options of the disk array device 10 that are controlled by the control function of the basic enclosure 11. A maximum of four additional enclosures 12 can be connected to the basic enclosure 11, for example.

A plurality of control packages 13, a plurality of power supply units 14, a plurality of battery units 15, and a plurality of disk drives 26 are detachably provided in the basic enclosure 11. A plurality of disk drives 26, a plurality of power supply units 14 and a plurality of battery units 15 are detachably provided in each of the additional enclosures 12. Further, a plurality of cooling fans 16 are also provided in the basic enclosure 11 and additional enclosures 12 respectively.

Control packages 13 are modules for implementing channel adapters (hereinafter 'CHA') 21, disk adapters (hereinafter 'DKA') 22 and a cache memory 23, and so forth (described subsequently). That is, a plurality of CHA packages, a plurality of DKA packages and one or more memory packages are detachably provided in the basic enclosure 11 and can be exchanged in package units.

Figure 3:
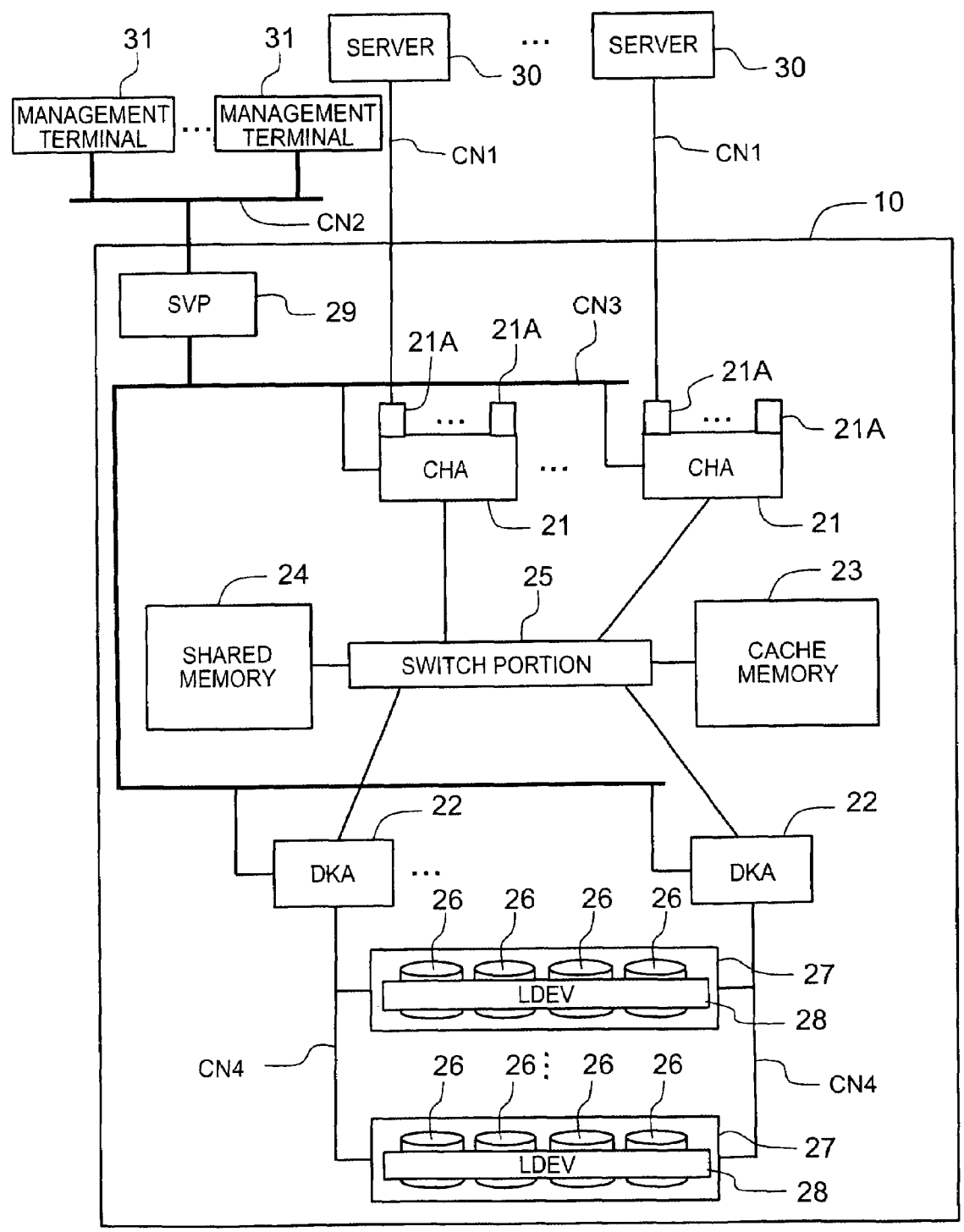
FIG. 3 is a block diagram showing an example of the constitution of the disk array device.

FIG. 3 is a block diagram showing the overall outline of the disk array device 10. The disk array device 10 can be connected such that two-way communications with a plurality of host computers 30 via the communication network CN1 are possible.

The communication network CN1 is, for example, a LAN, SAN, the Internet, a dedicated line, or the like. When a LAN is used, a data transfer between the host computers 30 and the disk array device 10 is performed in accordance with TCP/IP, for example. When a SAN is used, the host computers 30 and disk array device 10 perform data transfers in accordance with the Fiber Channel protocol, for example.

In addition, when the host computers 30 are mainframe computers, data transfers are performed in accordance with a communication protocol such as FICON (Fiber Connection: registered trademark), ESCON (Enterprise System Connection: registered trademark), ACONARC (Advanced Connection Architecture: registered trademark), or FIBARC (Fiber Connection Architecture: registered trademark), for example.

Each host computer 30 is implemented as a server, personal computer, workstation, mainframe, or the like, for example. For example, each host computer 30 is connected to a plurality of client terminals (outside the figure) via a separate communication network. Each host computer 30 provides each client terminal with services by writing and reading data to and from the disk array device 10 in accordance with requests from each client terminal, for example.

Each CHA 21 controls data transfers with respective host computers 30 and comprises a communication port 21A. The disk array device 10 can be provided with thirty-two CHA 21, for example. The CHA 21 is prepared in accordance with the type of host computer 30 as for an open-system CHA and a mainframe CHA, for example. Each CHA 21 is provided with a plurality of communication ports (abbreviated to 'ports' hereinbelow) 21A. As will be described subsequently, at least one or more LDEV can be connected to respective ports 21A.

Each CHA 21 receives data and commands requesting the reading/writing of data from the host computer 30 connected to each CHA 21 and operates in accordance with the commands received from the host computer 30.

A description that also includes the operation of the DKA 22 will be provided first. When the CHA 21 receives a read command form the host computer 30, this read command is stored in the shared memory 24. The DKA 22 references the shared memory 24 when required, and, upon finding an unprocessed read command, reads data from a disk drive 26 and stores this data in the cache memory 23. The CHA 21 reads the data moved to the cache memory 23 and sends this data to the host computer 30.

Meanwhile, upon receiving a write command from the host computer 30, the CHA 21 stores the write command in the shared memory 24. The CHA 21 also stores the received data (user data) in the cache memory 23. After storing the data in the cache memory 23, the CHA 21 reports write completion to the host computer 30. The DKA 22 reads the data stored in the cache memory 23 in accordance with the write command stored in the shared memory 24 and then stores this data in a predetermined disk drive 26.

A plurality, such as four or eight, of the respective DKA 22 can be provided, for example, in the disk array device 10. Each of the respective DKA 22 control data communications with each disk drive 26. The respective DKA 22 and disk drives 26 are connected via a communication network CN4 such as a SAN, for example, and perform block-unit data transfers in accordance with the Fiber Channel Protocol. The respective DKA 22 monitor the states of the disk drives 26 when required and the monitoring results are sent to an SVP 29 via an internal network CN3.

The respective CHA 21 and DKA 22 comprise a print substrate on which a processor, memory, and so forth, for example, are mounted, and a control program stored in memory (none is illustrated). As a result of a collaborative operation between this hardware and software, respective predetermined functions are implemented.

The cache memory 23 stores user data and so forth, for example. The cache memory 23 is constituted by nonvolatile memory, for example. In cases where volume copying and differential copying and so forth are performed, copy target data is read to the cache memory 23 and then transferred from the cache memory 23 to the copy destination by means of either the CHA 21 or DKA 22 or by means of both the CHA 21 and the DKA 22.

The shared memory (or control memory) 24 is constituted by nonvolatile memory, for example. Control information, management information, and so forth, for example, are stored in the shared memory 24. A plurality of the shared memory 24 and cache memory 23 can be provided. Further, the cache memory 23 and shared memory 24 can also be mounted in combination on the same memory substrate. Alternatively, part of the memory can be used as a cache region while another part thereof can be used as a control region.

A switch portion 25 connects each CHA 21, each DKA 22, the cache memory 23, and the shared memory 24. As a result, all the CHA 21 and DKA 22 are capable of accessing the cache memory 23 and shared memory 24. The switch portion 25 can be constituted as an ultra-high-speed crossbar switch or similar, for example.

The disk array device 10 allows a multiplicity of disk drives 26 to be mounted. Each disk drive 26 can be implemented as a hard disk drive (HDD), a semiconductor memory device, or the like, for example.

The disk drive 26 is a physical storage device. Although variations also exist depending on the RAID constitution and so forth, a RAID group 27, which is a virtual logical region, is constructed on a physical storage region provided by a set of four disk drives 26, for example. In addition, one or more virtual logical volumes (LDEV) 28 can be provided on the RAID group 27.

Further, the storage resources used by the disk array device 10 need not all be provided in the disk array device 10. The disk array device 10 is also capable of incorporating and utilizing storage resources that exist outside the disk array device 10 as if these resources were its own storage resources.

The service processor (SVP) 29 is connected to each CHA 21 and each DKA 22 via an internal network CN3 such as a LAN. Further, the SVP 29 can be connected to a plurality of management terminals 31 via a communication network CN 2 such as a LAN. The SVP 29 collects various states within the disk array device 10 and supplies these states to the management terminals 31.

The management terminals 31 serve the purpose of making, via the SVP 29, a variety of settings such as those for the RAID constitution of the disk array device 10.

Figure 4:
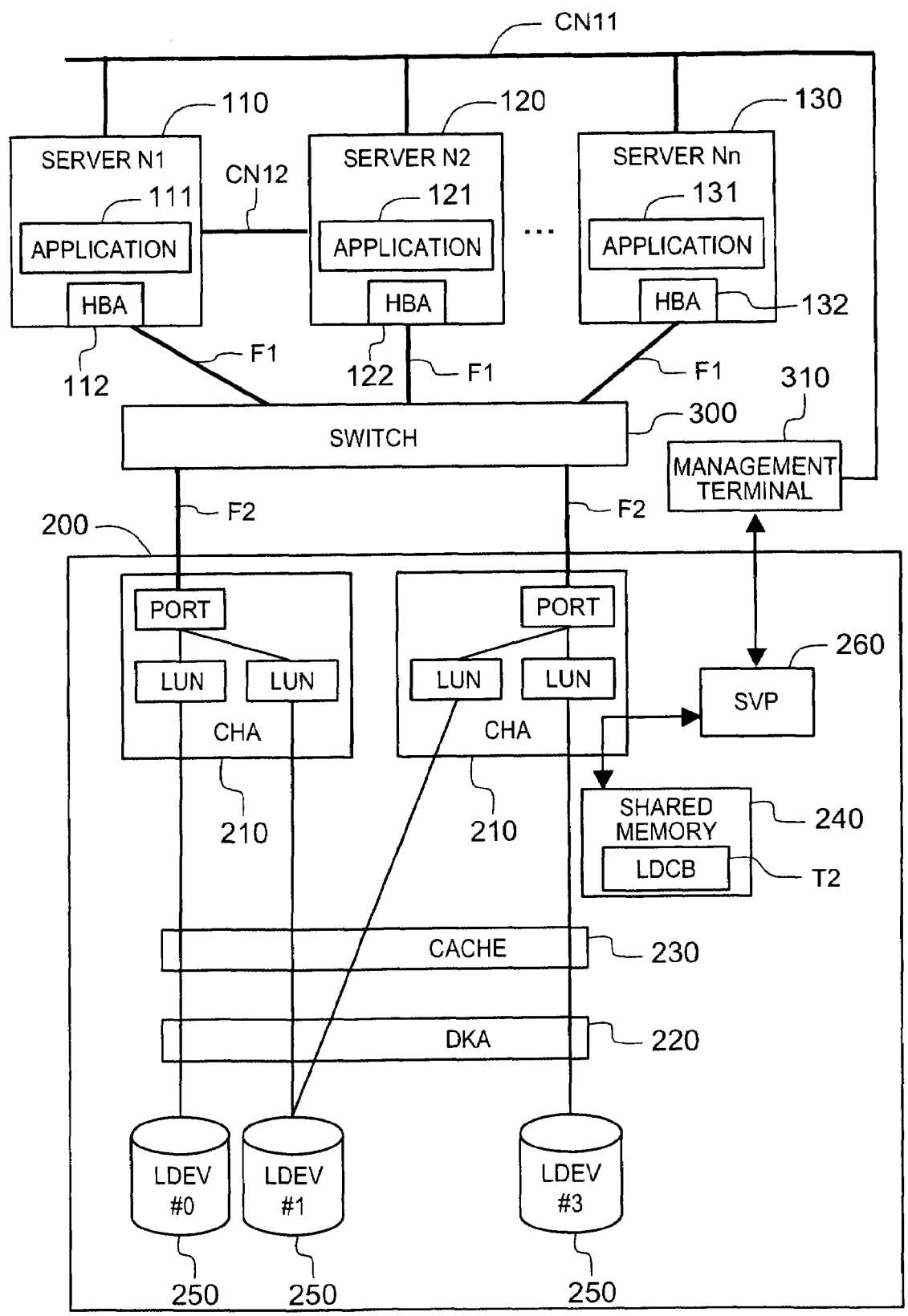
FIG. 4 is a block diagram of a disk array device that allows cancellation of a reserved state.

FIG. 4 is a schematic block diagram of a storage system that comprises a disk array device 200 capable of canceling the reserved states of each LDEV. This storage system comprises a plurality of servers 110, 120, and 130, a disk array device 200, a Fiber Channel Switch (abbreviated to 'switch') 300, and a management terminal 310.

Each of the servers 110, 120 and 130 is equipped with task application programs (abbreviated to 'application') 111, 121, and 131 respectively, and has HBA (Host Bus Adapter) 112, 122, and 132 respectively for performing communication control.

The server 110 (N1) and server 120 (N2) are connected via a communication network CN 12 such as a LAN, and constitute a failover cluster. A failover cluster is a system whereby a failover destination server takes over a task when any one of respective loosely-coupled servers shuts down due to a fault or the like. The failover cluster is identified overall as one computer by a client terminal that uses the cluster.

The disk array device 200 can be provided with the constitution described in FIGS. 2 and 3, for example. The disk array device 200 comprises, for example, a plurality of CHA 210, a plurality of DKA 220 (only one is illustrated), a cache memory 230, a shared memory 240, a plurality of LDEV 250, and an SVP 260.

The details will be described subsequently in conjunction with FIG. 5. However, the CHA 210 comprises a plurality of ports. At least one or more LUN can be allocated to each port. The CHA 210 corresponds to the CHA 21 in FIG. 3.

The DKA 220 exchanges data with each LDEV 250. The DKA 220 corresponds to the DKA 22 in FIG. 3. The cache memory 230 is memory that stores data for which writing has been requested by the servers 110 to 130 and data for which reading has been requested by same. The cache memory 230 corresponds to the cache memory 23 in FIG. 3. A shared memory 240 is memory for storing control information, management information, and so forth. The shared memory 240 corresponds to the shared memory 24 in FIG. 3. The details will be provided subsequently, but port-LUN constitution information T1 and LDEV exclusive control information (LDCB: Logical Device Control Block) T2 are each stored in the shared memory 240.

The LDEV 250 are logical storage devices (logical volumes) that are established on storage regions provided by physical storage devices (the disk drives 26 in FIG. 3, for example). The LDEV 250 corresponds to the LDEV 28 in FIG. 3. At least one or more LUN are allocated to one LDEV 250. A plurality of LUN (or a plurality of ports) can also be allocated to one LDEV 250.

The SVP 260 collects information relating to various states in the disk array device 200 and reflects setting changes instructed by the management terminal 310. The SVP 260 corresponds to the SVP 29 in FIG. 3. The details will be provided subsequently, but the SVP 260 updates an LDCB (T2) stored in the shared memory 240 based on instructions from the management terminal 310. The SVP 260 and respective CHA 210, and the respective CHA 210 and shared memory 240, and so forth, are connected via communication paths (not shown) such as those of the internal network CN3 shown in FIG. 3. The SVP 260 is able to access the shared memory 240 via any CHA 210. Further, because the DKA 220 and shared memory 240 are also connected via an internal communication network, the SVP 260 is also capable of accessing the shared memory 240 via any one DKA 220.

The switch 300 is a connection circuit for connecting a plurality of servers 110 to 130 and a disk array device 200. The switch 300 and the HBA 112, 122, and 132 are each connected via a cable F1. The switch 300 and each port of the respective CHA 210 are connected via cables F2. Cables F1 and F2 are constituted as optical fiber cables, metal cables, or the like, for example.

The management terminal 310 makes a variety of settings for the disk array device 200 via the SVP 260 and displays and monitors a variety of states of the disk array device 200. The management terminal 310 corresponds to the management terminal 31 in FIG. 3. The management terminal 310 can also be connected to the servers 110 to 130 via the communication network CN11.

Figure 5:
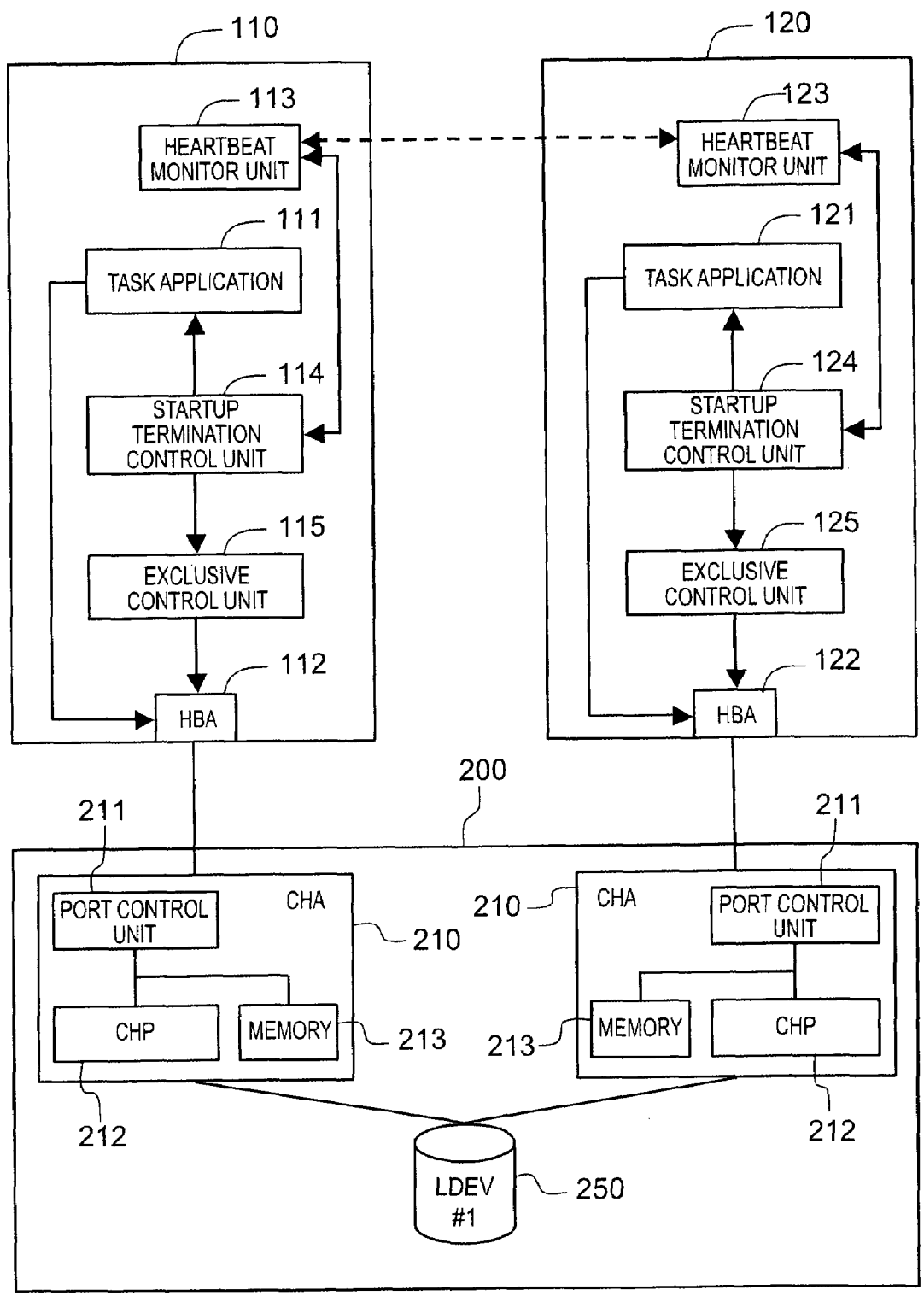
FIG. 5 is a block diagram showing a more detailed constitution with a server and CHA.

FIG. 5 is a block diagram showing a more detailed constitution with servers 110, 120 and CHA 210. The server 110 comprises a heartbeat monitor unit 113, a startup termination control unit 114, and an exclusive control unit 115 in addition to the task application programs 111 and the HBA 112, for example. The heartbeat monitor unit 113 performs heartbeat communications with another server 120 and thus the other server 120 monitors whether system shutdown or the like has occurred. The startup termination control unit 114 controls the activation and termination of the application 111. The exclusive control unit 115 is for the exclusive usage of the LDEV 250 shared by the respective servers 110 and 120.

Similarly to the server 110, the server 120 can be constituted comprising application 121, HBA 122, a heartbeat monitor unit 123, a startup termination control unit 124, and an exclusive control unit 125. The functions of each of these parts are the same as those described for server 110 and therefore a description of these parts is omitted here.

Each CHA 210 can comprise a port control unit 211, a CHP (CHannel Processor) 212, and a memory 213, for example. The port control unit 211 exchanges data based on a predetermined protocol such as the Fiber Channel Protocol, for example. The CHP 212 controls the overall operation of the CHA 210. Port-LUN constitution information T1 or the like is stored in the memory 213.

In the illustrated example, a predetermined LDEV 250 with which the disk array device 200 is provided is shared by the servers 110 and 120. Supposing that server 110 is an operating system server and server 120 is a standby system server, the server 110 normally reserves LDEV 250 and captures and exclusively uses an access lock. When the server 110 undergoes a system shutdown, server 120 acquires the access lock of the LDEV 250 and then takes over the task services provided by the server 110.

FIG. 6 is an explanatory view of an example of port-LUN constitution information T1. This port-LUN constitution information T1 is stored in both the memory 213 of the respective CHA 210 and the shared memory 240, for example.

The port-LUN constitution information T1 is constituted comprising a serial number (#), the number of each port, the LUN associated with each port, and the LDEV number of the LDEV 250 associated with each LUN, for example. The CHA 210 references the port-LUN constitution information T1 when access is requested by the servers 110 to 130. The servers 110 to 130 specify the access destination port number (port name) and access destination LUN and issue commands. The CHA 210 references the port-LUN constitution information T1 based on the port number and LUN and specifies the access target LDEV 250.

In the example shown in FIG. 6, the LDEV 250 specified by the LDEV number '0001' can be accessed via two paths. One path is a path from port number '1' via LUN '1'. The other path is a path that allows access from port number '2' via LUN '1'.

FIG. 7 is an explanatory view of an example of control information LDCB (T2) for managing the state of the LDEV 250. The LDCB (T2) can be constituted to associate serial numbers, port numbers, LUN, LDEV numbers, flags indicating reserved states, path information for establishing a reservation, flags indicating persistent reserved states, path information for establishing a persistent reservation, flags indicating ACA (Automatic Contingent Allegiance) states, path information for an ACA state, and flags indicating UA (Unit Attention) states, for example.

Here, ACA states are states that are established to deny usage of the access path when a fault occurs in a certain access path, for example. The ACA state can be cancelled by a cancellation command from the server that established the ACA state. However, in the present embodiment, an ACA state can also be cancelled by the management terminal 310 via the SVP 260.

A UA state is a state that is established directly after startup of the disk array device 200, for example. As described subsequently, when a reserved state is cancelled by the management terminal 310 via the SVP 260, the UA state is established.

The persistent reserved state is a state where one or a plurality of LDEV 250 is reserved via a plurality of preset access paths. In a normal reserved state, access to a predetermined LDEV 250 is possible via only one access path. In the persistent reserved state, a predetermined LDEV 250 can be accessed via each of a plurality of access paths. In this embodiment, a persistent reserved state can be cancelled via the SVP 260 from a management terminal 310.

Figure 8:
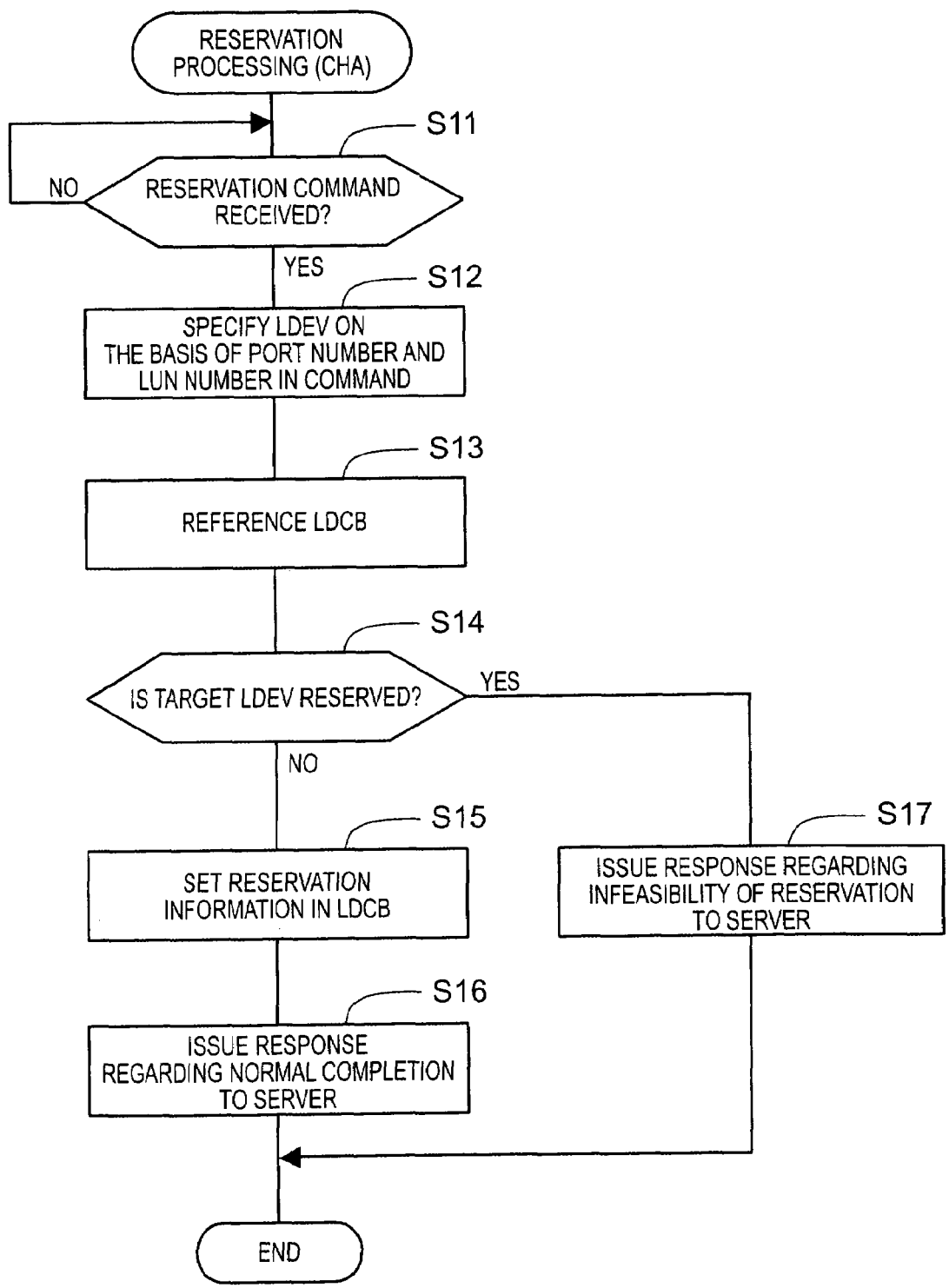
FIG. 8 is a flowchart of reservation processing.

The operation of the disk array device 200 and so forth will now be described based on FIGS. 8 to 14. FIG. 8 is a flowchart showing an outline of reservation processing that is executed by the disk array device 200. This reservation processing is processing for a case where the server reserves and exclusively employs a desired LDEV. Reservation processing is executed by means of the CHA 210 (more precisely, the CHP 212) that receives the reservation command, for example.

The CHA 210 monitors (S11) whether reservation commands from the servers 110 to 130 have been received (S11). When a reservation command has been received (S11: YES), the CHA 210 references the port-LUN constitution information T1 on the basis of the port number and LUN number contained in the reservation command, and specifies the LDEV number of the reservation target (S12).

Next, the CHA 210 references (S13) the LDCB (T2) and judges (S14) whether the reservation target LDEV has already been reserved. When the reservation target LDEV is not in the reserved state (S14: NO), the CHA 210 sets reservation information for the reservation target LDEV (S15). Reservation information as stated here is information indicating via which access path (WWN (World Wide Name) of HBA, port number, or the like) a reservation has been made. This reservation information is reflected in the LDCB (T2). After establishing a reserved state for the requested LDEV, the CHA 210 issues a response (S15) regarding normal completion to the server that issued the reservation command.

On the other hand, when the reservation target LDEV has already been reserved by another server (S14: YES), the CHA 210 issues a response (S17) to the server that issued the reservation command to the effect that the reservation is not possible. Therefore, when server 110 has reserved a predetermined LDEV 250, for example, other servers 120 and 130 are unable to reserve the LDEV 250 as long as the reserved state of the server 110 prevails.

Figure 9:
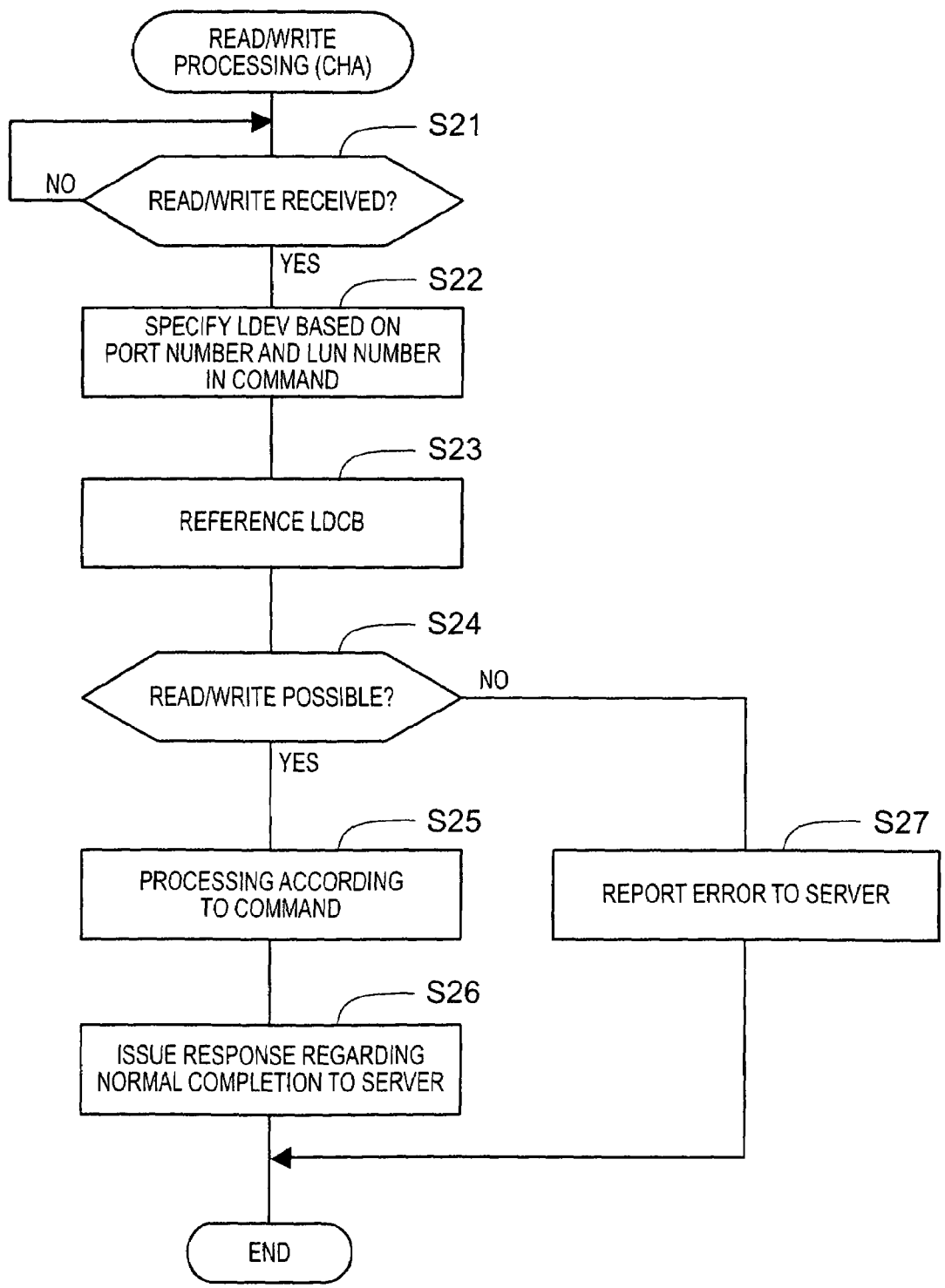
FIG. 9 is a flowchart of read/write processing.

FIG. 9 is a flowchart showing an outline of read/write processing (I/O processing) that is executed by the disk array device 200. This I/O processing is executed by the CHA 210, or by the CHA 210 and DKA 220, for example.

The CHA 210 monitors (S21) whether a read command or write command has been received from servers 110 to 130. When either a read command or write command has been received (S21: YES), the CHA 210 references the port-LUN constitution information T1 based on the port number and LUN number contained in the command, and thus specifies (S22) the LDEV number constituting the command processing target.

Next, the CHA 210 references (S23) the LDCB (T2) and judges whether I/O processing is possible by accessing the target LDEV (S24). For example, when the LDEV, for which data writing or the like was requested, has been reserved by a server other than the server that was the source of the write command, access to this LDEV is not possible. In addition, when the command-issuing source server does not possess the right to access the LDEV, command processing cannot be performed. Conversely, in cases where no restriction (reservation or the like) has been established for the LDEV that is the command processing target or where the command-issuing source server possesses predetermined access rights, command processing can be performed by accessing this LDEV.

When I/O processing is possible (S24: YES), the CHA 210 executes processing corresponding with the command (S25) and issues a response regarding normal completion to the command-issuing source server (S26). For example, in the case of a write command, at a time when data for which writing was requested has been stored in cache memory 230, write completion can be reported to the command-issuing source server. As a result, the responsiveness of the disk array device 200 is raised. Data received from the server is multiplexed and managed on the cache memory 230 and then written to the disk drive when the opportunity arises.

When the requested I/O processing is not possible (S24: NO), the CHA 210 reports an error (S27) to the command-issuing source server.

Figure 10:
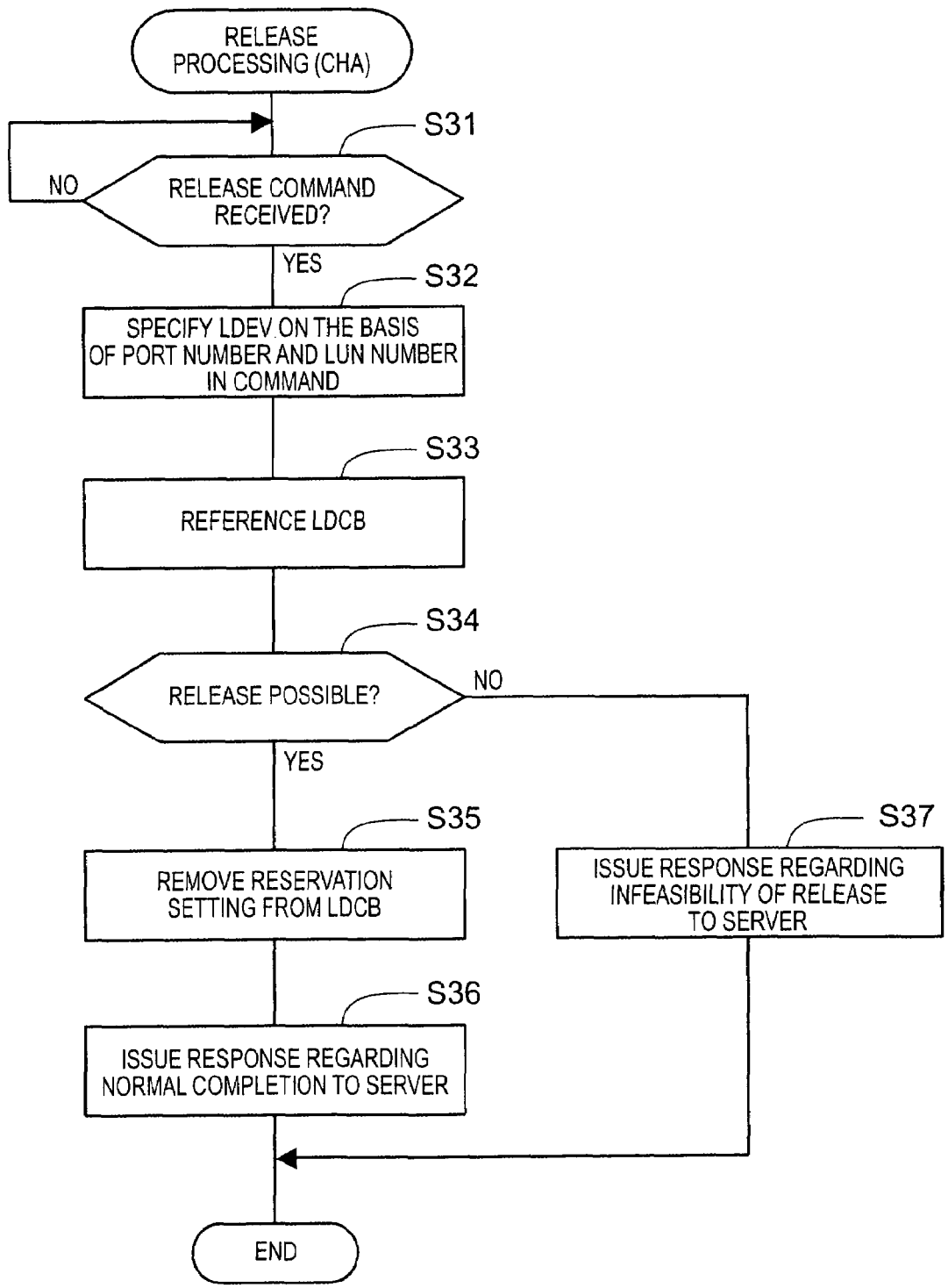
FIG. 10 is a flowchart of release processing.

FIG. 10 is a flowchart showing an outline of the release processing executed by the disk array device 200. This release processing is performed in cases where the server that reserved the LDEV spontaneously cancels the reserved state. The release processing is executed by the CHA 210 that received the release command, for example.

The CHA 210 performs monitoring to determine whether a release command is received from the servers 110 to 130 (S31). When a release command is received (S31: YES), the CHA 210 references the port-LUN constitution information T1 based on the port number and LUN number contained in the release command and specifies the release target LDEV number (S32).

Next, the CHA 210 references the LDCB (T2) (S33) and judges whether release is possible (S34). Here, a case where release is possible is a case where the release-command issuing source server has the right to access the release target LDEV and the LDEV has been placed in a reserved state, for example. A case where release is impossible is either a case where the release command issuing source server does not possess access rights for the release target LDEV or a case where the release target LDEV is not reserved, for example, or both these cases.

When release is possible (S34: YES), the CHA 210 cancels the reserved state set for the release target LDEV (S35) and issues a response regarding normal completion to the release-command issuing source server (S36). When release is impossible (S34: NO), the CHA 210 issues a response to the effect that release processing cannot be executed (S37) to the release command issuing source server.

Figure 11:
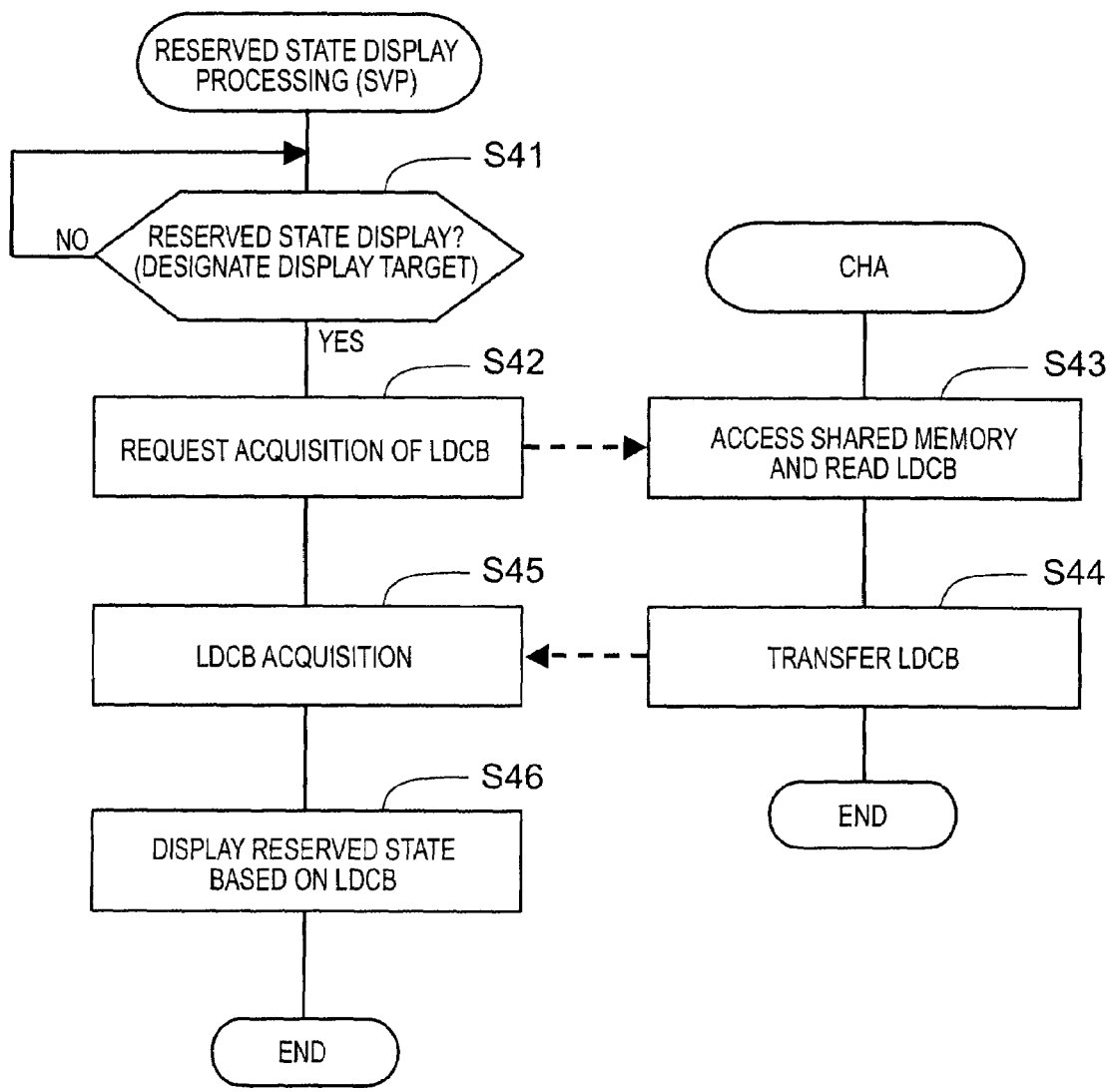
FIG. 11 is a flowchart showing reserved state display processing for each LDEV unit.

FIG. 11 is a flowchart showing an outline of reserved state display processing that is executed by the disk array device 200. The reserved state display processing is executed in order for a user such as a system administrator to determine the reserved state for each LDEV of the disk array device 200, for example. The reserved state display processing is implemented by means of a collaborative operation by the SVP 260 and CHA 210, for example. Further, although, for expediency in the description, the focus is on the reserved state of the reservation command, other possibilities exist. Persistent reserved states, ACA states, and so forth, can also be displayed and confirmed on the terminal screen of the management terminal 310.

A user desiring confirmation of the reserved state of an LDEV unit logs onto the SVP 260 via the management terminal 310 and requests a display of the reserved state (S41). Here, the user designates one or a plurality of LDEV for which a display is desired. The user can indirectly designate an LDEV by means of a serial number (#), path information (port number, WWN, and so forth) indicated by the LDCB (T2), or can directly designate the LDEV number.

When the display of the reserved state is requested by the management terminal 310, the SVP 260 (S41: YES) requests acquisition of the LDCB (T2) from the CHA 210 (S42). Here, there is no need to request the whole of the LDCB (T2), it being sufficient to request only LDCB information relating to the LDEV for which a display of the reserved state has been requested by the management terminal 310. When the user desires the display of the reserved state for all the LDEV, all the information registered in the LDCB (T2) can be requested.

The CHA 210 accesses the shared memory 240 and reads the information (S43) requested by the SVP 260 from the LDCB (T2). The CHA 210 transfers the read information to the SVP 260 (S44).

The SVP 260 acquires the LDCB from the CHA 210 (S45) and displays (S46) the reserved state of each LDEV on the terminal screen of the management terminal 310 on the basis of the LDCB. As a result, the user is able to confirm the desired LDEV state in the form shown in FIG. 7, for example.

Figure 12:
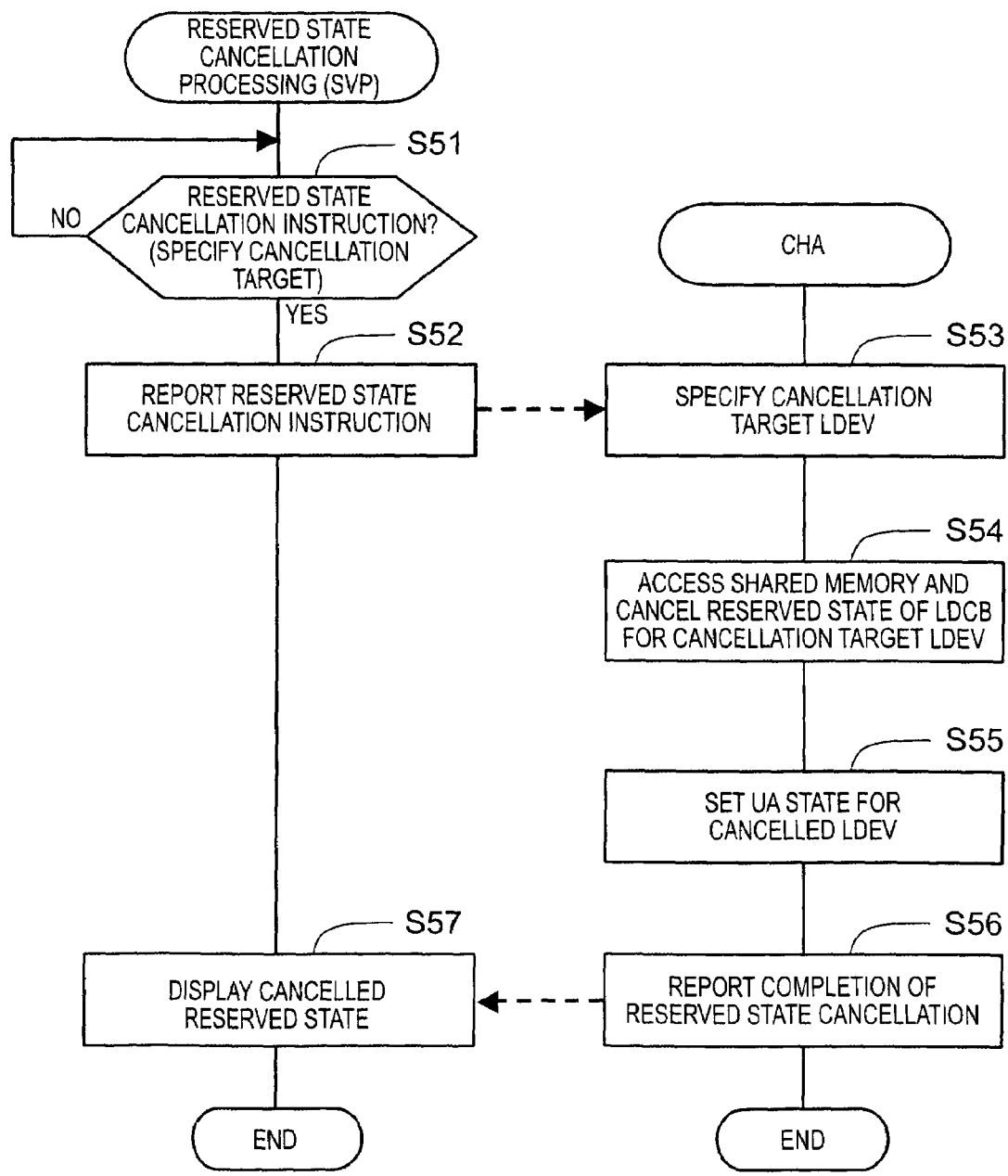
FIG. 12 is a flowchart showing reserved state cancellation processing for each LDEV unit.

FIG. 12 is a flowchart showing an outline of reserved state cancellation processing that is executed by the disk array device 200. This reserved state cancellation processing is executed in order that the user cancel reserved states in LDEV units. The reserved state cancellation processing is implemented by means of a collaborative operation by the SVP 260 and CHA 210, for example.

First, the user designates the LDEV for which the cancellation of the reserved state is desired (S51) via the management terminal 310. Here, as described in FIG. 11, the user is able to designate one or a plurality of LDEV for which the cancellation of the reserved state is desired, based on the reserved states of the LDEV units displayed on the terminal screen. Alternatively, the user can also designate the LDEV for which cancellation of the reserved state is desired without checking the reserved state display screen.

When the SVP 260 receives an instruction to cancel a reserved state from the management terminal 310 (S51), the SVP 260 instructs the CHA 210 to cancel the reserved state (S52). Information allowing the LDEV whose reserved state is to be cancelled to be specified (serial number, path information, LDEV number), is contained in the cancellation instruction information.

Upon receiving the cancellation instruction from the SVP 260, the CHA 210 specifies the cancellation target LDEV (S53). The CHA 210 accesses the LDCB (T2) in the shared memory 240, resets the reserved state flag set for the cancellation target LDEV, and cancels the reserved state (S54). Thereafter, the CHA 210 sets (S55) the flag indicating the UA state for the LDEV whose reserved state has been cancelled and reports the fact that the reserved state cancellation is complete to the SVP 260 (S56).

Upon receipt of a cancellation report from the CHA 210, the SVP 260 displays the fact that the reserved state has been cancelled for the requested LDEV on the terminal screen of the management terminal 310 (S57).

Figure 13:
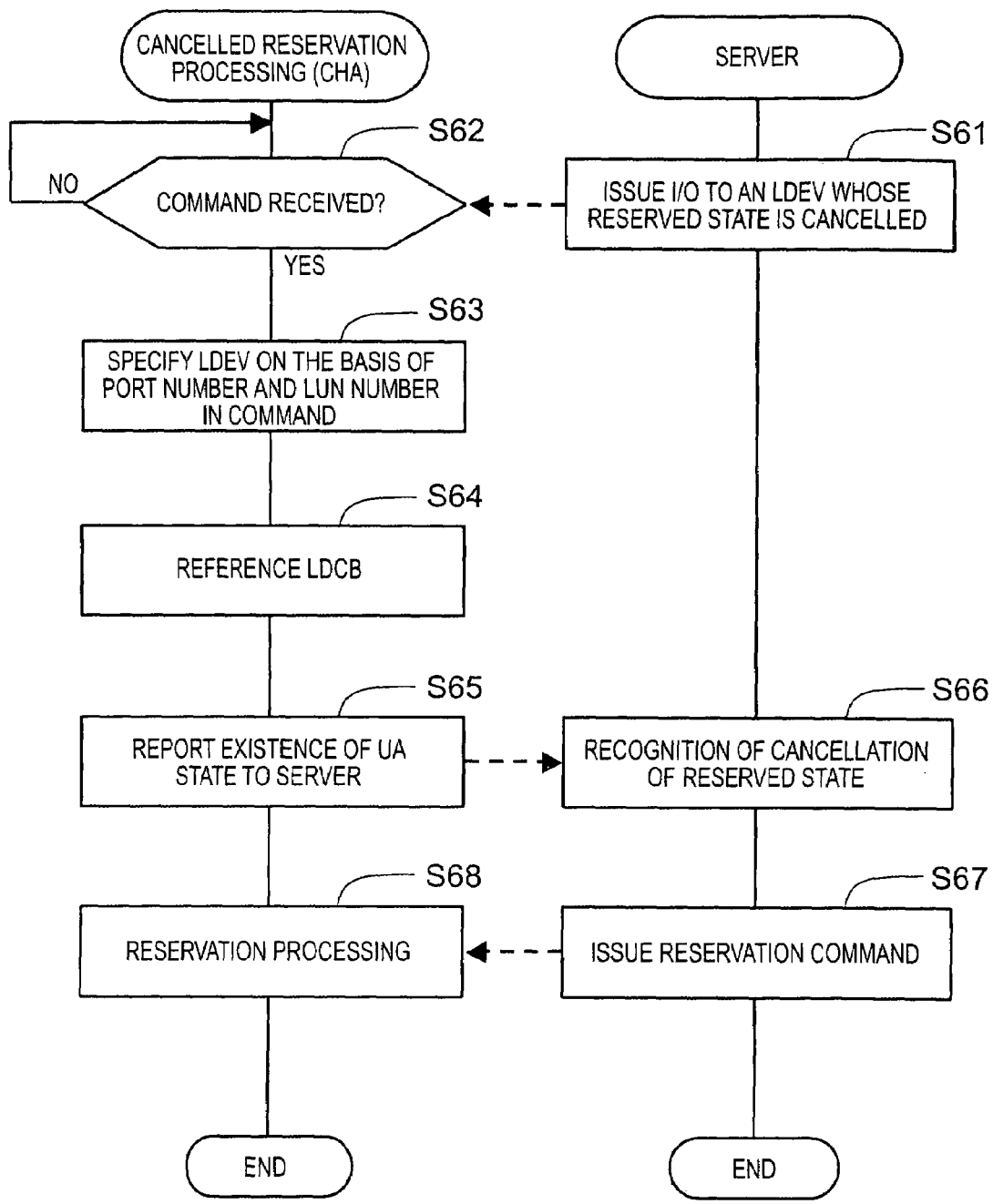
FIG. 13 is a flowchart showing new reservation processing once the reserved state has been cancelled.

FIG. 13 is a flowchart showing the new reservation processing after reserved state cancellation executed between the disk array device 200 and the servers 110 to 130. Here, for expediency in the description, the reserved state of the shared LDEV reserved by the server 110 is cancelled by the reserved state cancellation processing shown in FIG. 12 and then the server 120 establishes a reservation for the shared LDEV.

The server 120 issues (S61) an I/O command (read command, write command, and reservation command, or the like) for the LDEV shared with the server 110. Upon receipt of a command from the server 120 (S62: YES), the CHA 210 references the port-LUN constitution information T1 and specifies the LDEV constituting the command processing target (S63).

The CHA 210 references (S64) the LDCB (T2) relating to the specified LDEV and detects placement of the LDEV in the UA state. As detailed above, in this embodiment, an LDEV is set to the UA state after the reserved state has been cancelled by the disk array device 200. Therefore, the CHA 210 reports that the object LDEV has been placed in the UA state to the server 120 (S65).

As a result of receiving the report regarding the UA state from the CHA 210, the server 120 is able to determine that the reservation of the object LDEV has not be established (S66). Therefore, the server 120 issues (S67) a reservation command for exclusive usage of the object LDEV. Upon receipt of the reservation command, the CHA 210 performs reservation processing shown in FIG. 8 (S68).

Figure 14:
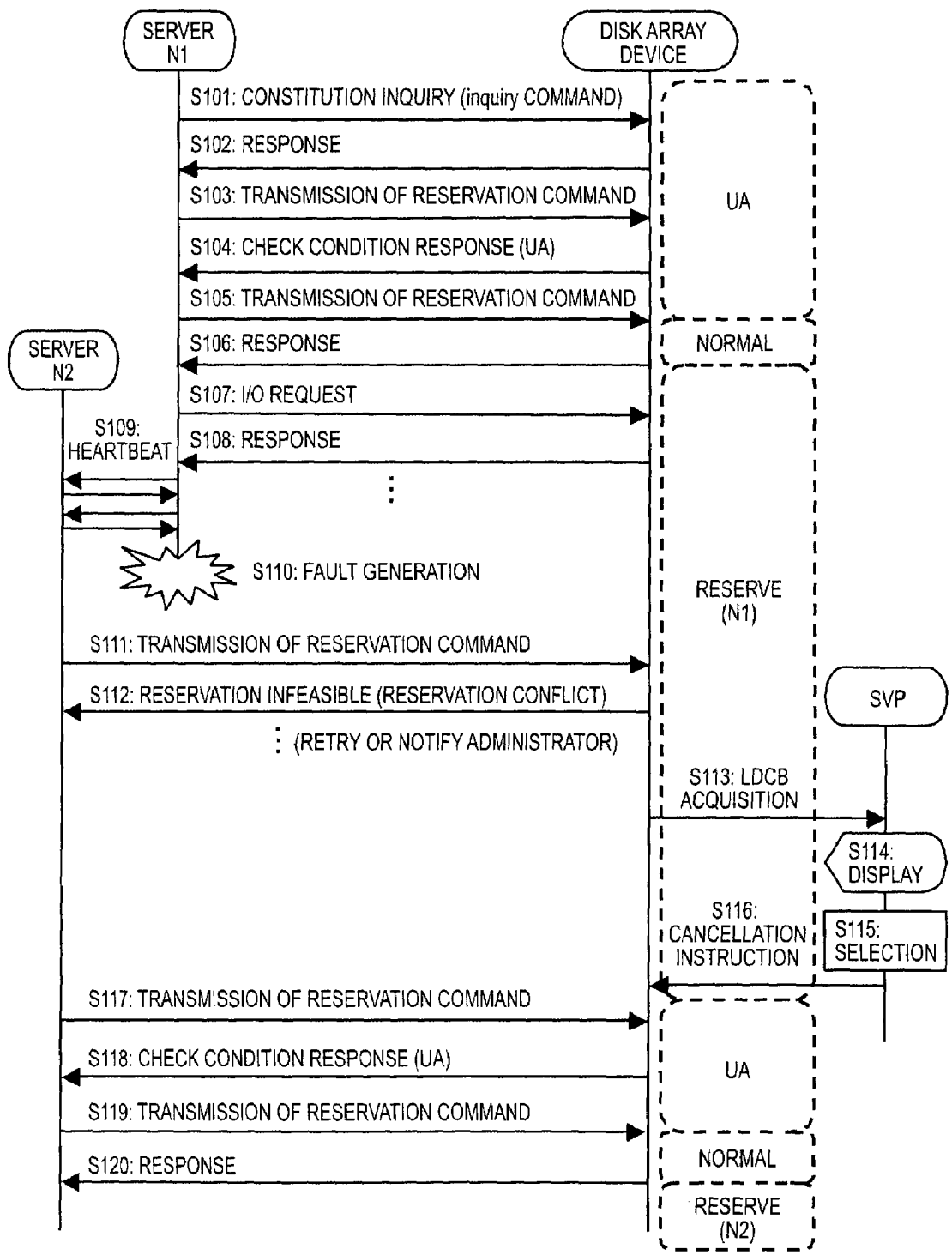
FIG. 14 is a sequence diagram showing the flow of the whole operation.

The processing for each for the functions has been described on the basis of the above drawings. FIG. 14 is a sequence diagram showing the flow of the overall processing during the interval from reservation setting up until resetting of the reservation. In this figure, 'server N1' denotes server 110, and 'server N2' denotes server 120.

The server 110 acquires information relating to LDEV that can be used by the disk array device 200 by issuing an inquiry command, for example (S101, S102). The server 110 issues a reservation command (S103). The disk array device 200 returns a check condition response (S104) in response to this reservation command. This check condition response indicates that the LDEV for which reservation was requested has been placed in the UA state. The UA state is set for the LDEV during activation of the disk array device 200. This UA state resets upon receipt of a command of any kind.

As a result of the check condition response, the server 110 determines that the desired LDEV has not been placed in the reserved state and can therefore be reserved. Hence, the server 110 issues a reservation command once again (S105). Upon receipt of the reservation command, the disk array device 200 sets the reserved state by rewriting the LDCB (T2) information on the requested LDEV. The disk array device 200 returns a response to the effect that the LDEV has been set to the reserved state to the server 110 (S106).

Here, the UA state of the LDEV is cancelled and returned to a normal state at the time the disk array device 200 receives another reservation command from the server 110. Next, when the reserved state is set for the LDEV, the LDEV makes the transition from the normal state to the reserved state. After reserving the object LDEV, the server 110 issues an I/O request (S107). The disk array device 200 performs the processing requested by the server 110 and returns a response (S108).

The server 110 and server 120 constitute a failover cluster and perform heartbeat communications at regular intervals (S109). In cases where any fault occurs with the server 110 and a system shutdown occurs (S110), the reserved state of the LDEV is not cancelled. Upon detecting stoppage of heartbeat communications, the server 120 starts failover processing.

The server 120 requests reservation of a shared LDEV (S111) in order to take over the task application services provided by the server 110. However, due to the abrupt system shutdown of the server 110, the reserved state remains set for the LDEV. Therefore, the disk array device 200 returns 'reservation conflict' to the server 120 to report the fact that a reservation cannot be set (S112). The server 120 is able to continually resend a request command (retry process). Alternatively, forced cancellation of the reserved state can also be requested of the management terminal 310 by the server 120. This request may take the form of an automatic communication between computers or an electronic notification (electronic mail and so forth) to a user such as a system administrator.

The user logs onto the SVP 260 via the management terminal 310 and issues a request for the display of the reserved state of each LDEV to the SVP 260. The SVP 260, which has received the request from the management terminal 310, acquires (S113) all or part of the LDCB (T2) from the shared memory 240 of the disk array device 200. The SVP 260 displays the reserved state of each LDEV (can include the persistent reserved state and the ACA state) on the terminal screen of the management terminal 310 (S114).

The user determines the problematic reserved state on the basis of the reserved state of each LDEV displayed on the terminal screen. The user selects an LDEV whose reserved state remains set by means of the server 110 and requests cancellation of the reserved state. The SVP 260, which has received the cancellation instruction from the management terminal 310, issues an instruction to cancel the reserved state of the shared LDEV to the CHA 210 of the disk array device 200 (S116). Here, the SVP 260 is able to issue a cancellation instruction to a predetermined CHA 210 that has been preset or issue a cancellation instruction by selecting an optional CHA 210 from among a plurality of CHA 210.

The CHA 210 cancels the reserved state by erasing reservation information in the LDCB (T2) for the designated LDEV. Here, the CHA 210 sets the UA state for the LDEV whose reserved state has been cancelled.

The server 120 continuously issues a reservation command. In cases where the server 120 issues a reservation command after the state of the object LDEV has been changed from the reserved state of the server 110 to the UA state, the disk array device 200 returns a check condition response (S118). The placement of the object LDEV in the UA state is indicated in this check condition response.

Therefore, the server 120 issues a reservation command once again (S119). Upon receiving a reservation command, the disk array device 200 cancels the UA state of the reservation target LDEV. Thereafter, the disk array device 200 sets the reserved state for the LDEV and reports reservation completion to the server 120 (S120).

Further, the constitution is not limited to one in which the server 120 continuously issues a reservation command. A constitution in which the server 120 issues a reservation command with an electronic notification from the disk array device 200 (SVP 260, CHA 210, and so forth) or the management terminal 310 acting as a trigger is also acceptable.

Because this embodiment example is constituted as described above, the following effects are afforded. In this embodiment example, the reserved state can be confirmed for each LDEV unit. Hence, it is possible for the user to easily confirm the reserved state for each LDEV and determine the location of the problem at an early stage.

In particular, when a multiplicity of servers are connected to the disk array device 200, it is difficult to determine by which server the cancellation may be made and so forth. Therefore, labor and time are required for cancellation of the reserved state by the server and the maintainability drops. On the other hand, in this embodiment example, even when a multiplicity of servers are connected to the disk array device 200, reservation cancellations by the disk array device 200 can be executed in integrated fashion. Hence, with this embodiment example, maintainability and user-friendliness are improved.

In this embodiment example, an instruction for cancellation of the reserved state can be issued by the management terminal 310 in LDEV units via the SVP 260. Therefore, even in cases where the server undergoes a system shutdown with the reserved state still set, the reserved state can be easily cancelled by the disk array device 200. More particularly, in a case where a plurality of LDEV are associated with a single port, if reset processing is executed for all the ports or for the disk array device overall, the problematic LDEV also affects other servers using an independent LDEV. On the other hand, in this embodiment example, because the reserved state can be cancelled in LDEV units, it is possible to keep the range of influence to a minimum.

In this embodiment example, the status can be confirmed in each LDEV unit also with respect to the persistent reserved states, ACA states, and so forth, in addition to reserved states based on a reservation command, and thus states can be changed (cancelled) in integrated fashion by the disk array device 200.

2. Second Embodiment Example

A second embodiment example will now be described on the basis of FIGS. 15 to 17. This embodiment example corresponds to a modified example of the first embodiment example. One characteristic of this embodiment example lies in the fact that the reserved state set by a server with a lower access priority can be cancelled forcibly or automatically on the basis of access by a server with a high access priority.

Figure 15:
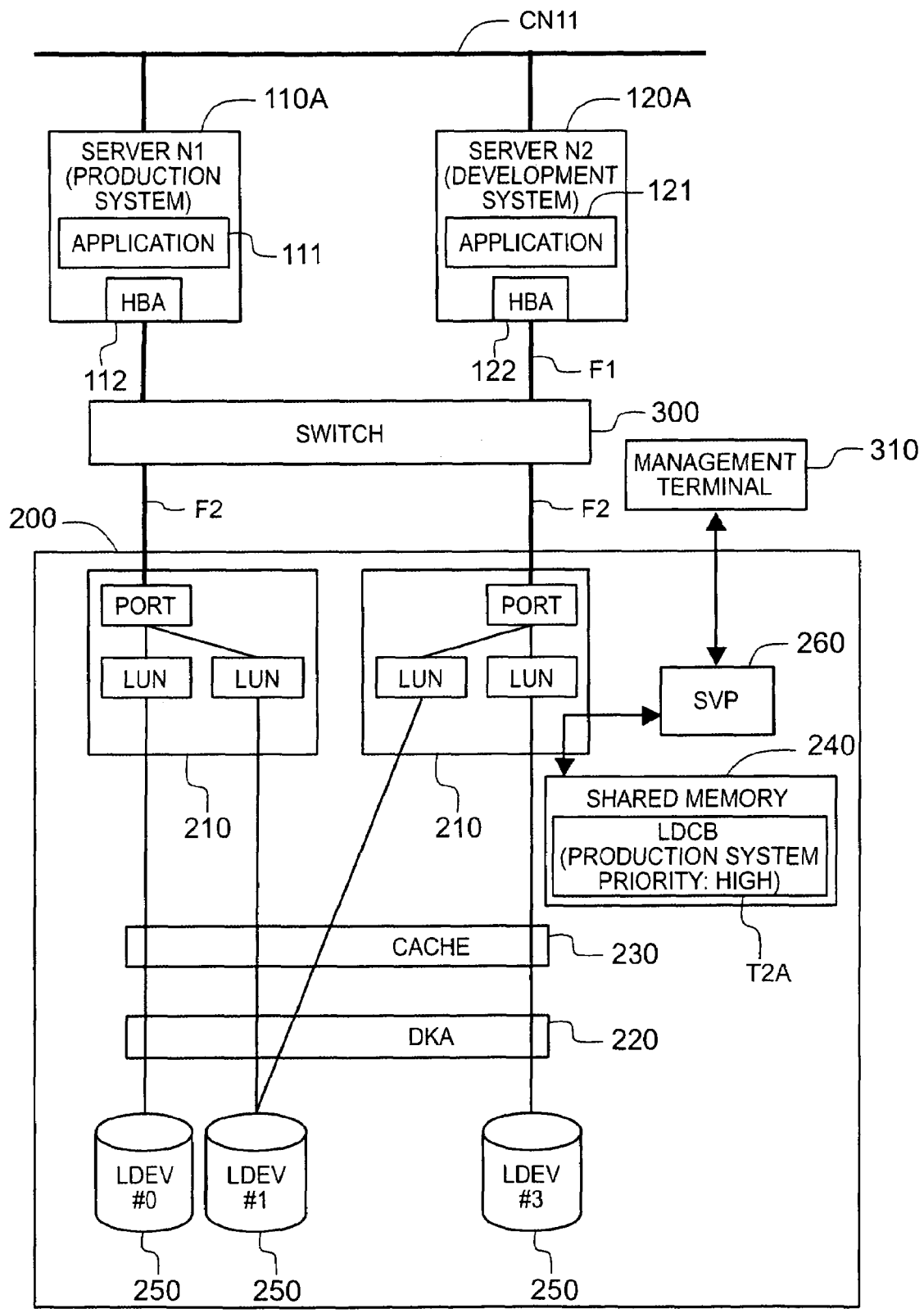
FIG. 15 is a block diagram of the disk array device relating to a second embodiment example.

FIG. 15 is a schematic block diagram showing the overall constitution of a storage system. The differences from the first embodiment example will be the focus of the description. A server 110A is used as a production-system server, and a server 120A is employed as a development-system server. The production-system server 110A is a server that provides the actual task. The development-system server 120A is a server that is used in the development of a production task application 111.

A LDCB (T2A) is stored in the shared memory 240. As shown in FIG. 16, in addition to information described in this embodiment example, 'access priorities' are established in the LDCB (T2A) of this embodiment example. The access priority is information for assigning relative merits to access by the servers 110A and 120A. For example, a priority is established for the access path from the servers 110A and 120A (port number and WWN, for example). In the illustrated example, a high access priority is established for the production-system server 110A. No particular access priority is established for the development-system server 120A. Therefore, in comparison, the access priority of the production-system server 110A is higher than that of the development-system server 120A. Therefore, access-priority level information can be set only for the access path (server) for which a high access priority has been set. Other possibilities exist, however. The access priority can also be set in a plurality of levels such as 'level 1', 'level 2', 'level 3', and so forth, for example. The access priority can be registered beforehand by the user from the management terminal 310 via the SVP 260, for example.

Figure 17:
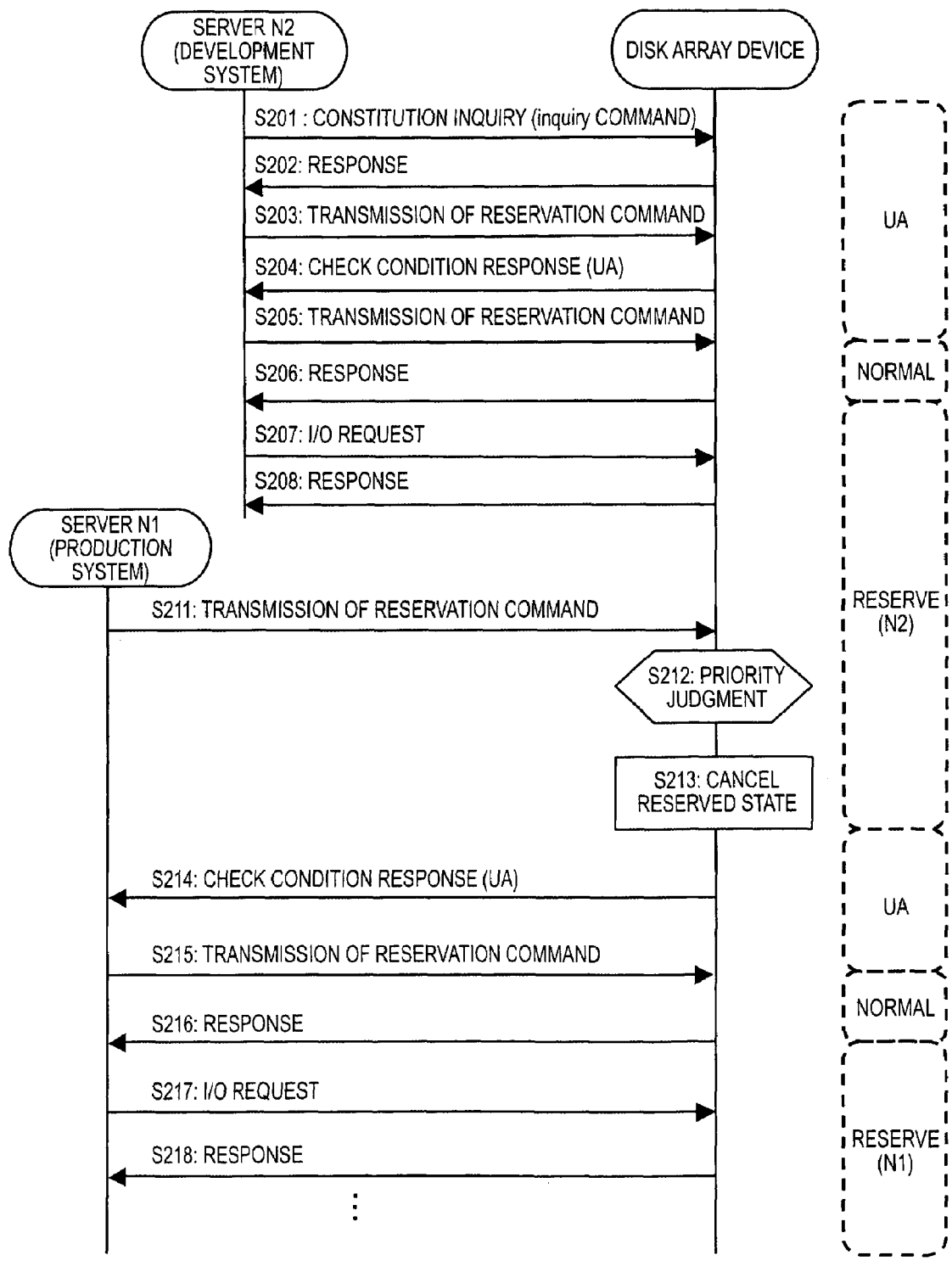
FIG. 17 is a sequence diagram showing the flow of the whole operation.

FIG. 17 is a sequence diagram showing the whole operation of this embodiment example. S201 to S208 correspond with S101 to S108 in FIG. 14 and therefore a detailed description thereof is omitted here. In S201 to S208, a predetermined LDEV is reserved by the development-system server 120A and the used status is shown.

The production-system server 110A requests usage of the LDEV (S211) in a situation where the development-system server 120A has reserved the LDEV. The disk array device 200 (CHA 210) then references the LDCB (T2A) to judge the access path priority (S212).

As described above, the access priority of the production-system server 110A is set higher than that of the development-system server 120A. Therefore, the disk array device 200 cancels the reserved state of the development-system server 120A. As a result, the LDEV reserved by the development-system server 120A makes the transition from the reserved state to the UA state.

The disk array device 200 returns a check condition response to the production-system server 110A (S214). In accordance with this check condition response, the production-system server 110A identifies the fact that the object LDEV has been placed in the UA state. Therefore, the production-system server 110A sends the reservation command once again (S215). As a result of receiving the reservation command, the LDEV changes from the UA state to the normal state.

The disk array device 200 sets a reserved state for the LDEV requested by the server 110A. The LDEV state thus changes from the normal state to the reserved state. After setting the reserved state for the requested LDEV, the disk array device 200 issues a report to the server 110A that the reservation is complete (S216).

The server 110A, which has confirmed the reservation of the desired LDEV, then reads/writes data from/to the LDEV (S217, S218). As a result, the server 110A supplies the production task to a client terminal (outside the figure).

This embodiment example affords the same effects as those of the first embodiment example. In addition, in this embodiment example, the constitution is such that the access priority is preset for the access path from the servers 110A and 120A, and, in a case where there is an access request from the server 110A with a high access priority, the reserved state of the server 120A with a low access priority is cancelled. Therefore, reservation of the server 120A with a low priority makes it possible prevent the effect on the task processing of the server 110A with a high priority, which improves user-friendliness.

In particular, as in the case of a production system and development system, or an operating system and standby system, for example, when the relative merits between servers are clearly established based on the constitution of the storage system, the operation of a server of high importance and urgency can be guaranteed and convenience improved.

3. Third Embodiment Example

Figure 18:
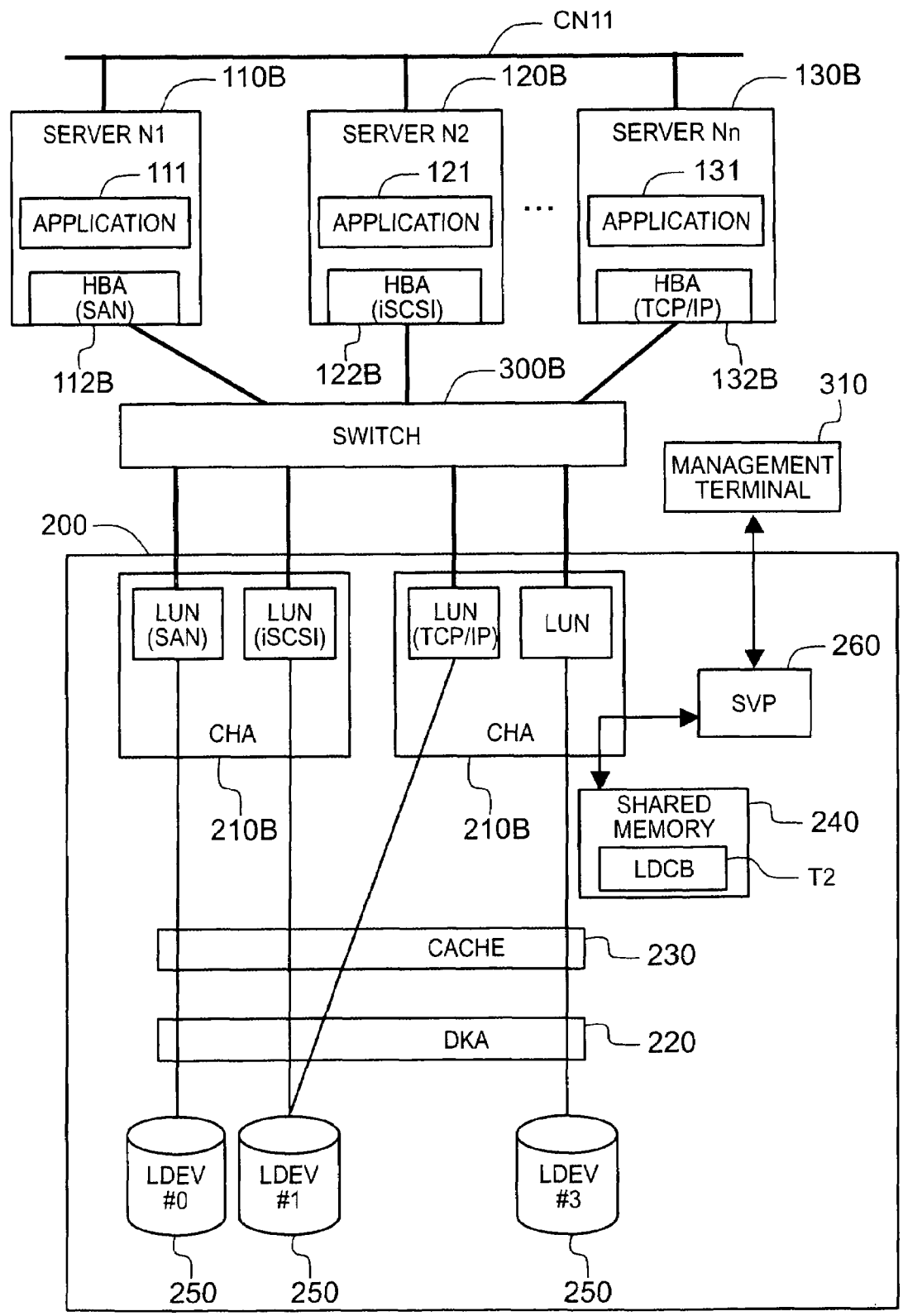
FIG. 18 is a block diagram of a disk array device relating to a third embodiment example.

FIG. 18 shows the overall constitution of a storage system that comprises the disk array device 200, relating to a third embodiment example of the present invention. This embodiment example is equivalent to a modified example of the first embodiment example. This embodiment example is characterized by the fact that same is applied to a disk array device 200 that supports a plurality of types of servers 110B, 120B and 130B each with a different communication interface.

The server 110B performs data communications in accordance with a SAN (Fiber Channel), for example. The server 120B performs data communications in accordance with an iSCSI (internet Small Computer System Interface), for example. The server 130B performs data communications in accordance with TCP/IP, for example. iSCSI is a protocol for sending and receiving SCSI commands between a server and disk array device via an IP network.

The disk array device 200 is provided with CHA 210B that correspond with a variety of protocols respectively, and can be constituted such that different types of protocols are supported within a single CHA package. Alternatively, the constitution may be matched to different types of protocol in respective CHA package units such as NAS (TCP/IP) CHA, mainframe CHA, and so forth.

This embodiment example also affords the same effects as those of the first embodiment example. In addition, the communication protocol, OS, and so forth, differ for each of the servers 110B, 120B, and 130B in a so-called multiplatform environment. Therefore, the specific operation for canceling the LDEV reservation from the server side varies from server to server. Hence, the cancellation, from the server side, of the reserved state that remains for an LDEV involves labor and time.

On the other hand, in the present embodiment example, even in cases where the communication protocol varies, reserved states can be cancelled in respective LDEV units by directly manipulating the LDCB (T2) that integrally manages the reserved states and so forth of respective LDEV. As a result, the maintainability and user-friendliness, and so forth, can be improved.

4. Fourth Embodiment Example

Figure 19:
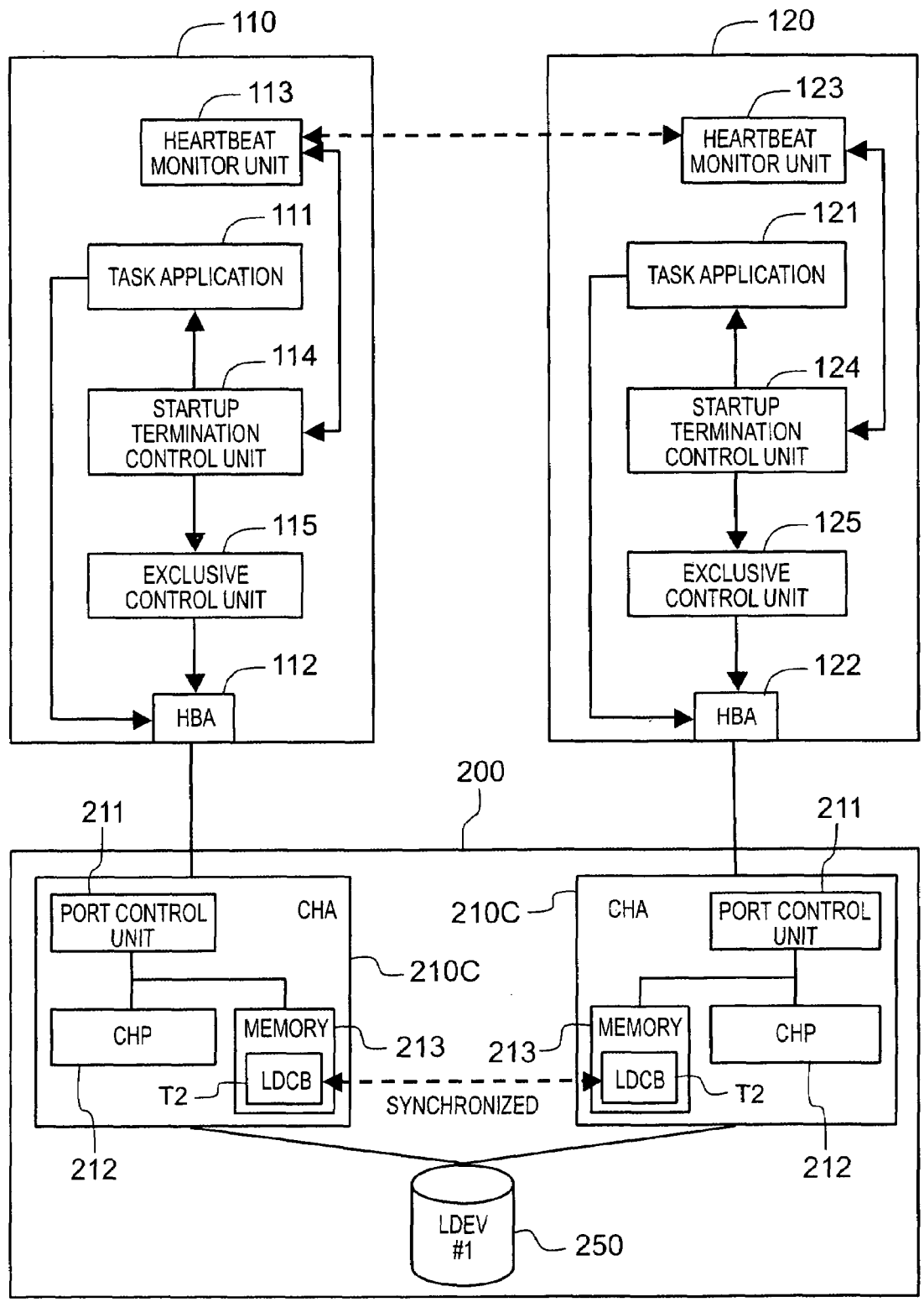
FIG. 19 is block diagram of a disk array device relating to a fourth embodiment example.

FIG. 19 is a block diagram of a fourth embodiment example of the present invention. This embodiment example is equivalent to a modified example of the first embodiment example. This embodiment example is characterized by the fact that the LDCB (T2) is not stored in the shared memory 240 but is instead stored in the memory 213 of the respective CHA 210.

Respective LDCB (T2) are stored in the memory 213 of respective CHA 210. Respective CHA 210 communicate with one another to match the content of the LDCB (T2). In cases where the content of the LDCB (T2) is changed in any one CHA 210, this change is also reflected in the LDCB (T2) stored in each of the other CHA 210.

Further, depending on the case, the constitution may be such that the LDCB (T2) is stored in the memory of each DKA 220.

5. Fifth Embodiment Example

Figure 20:
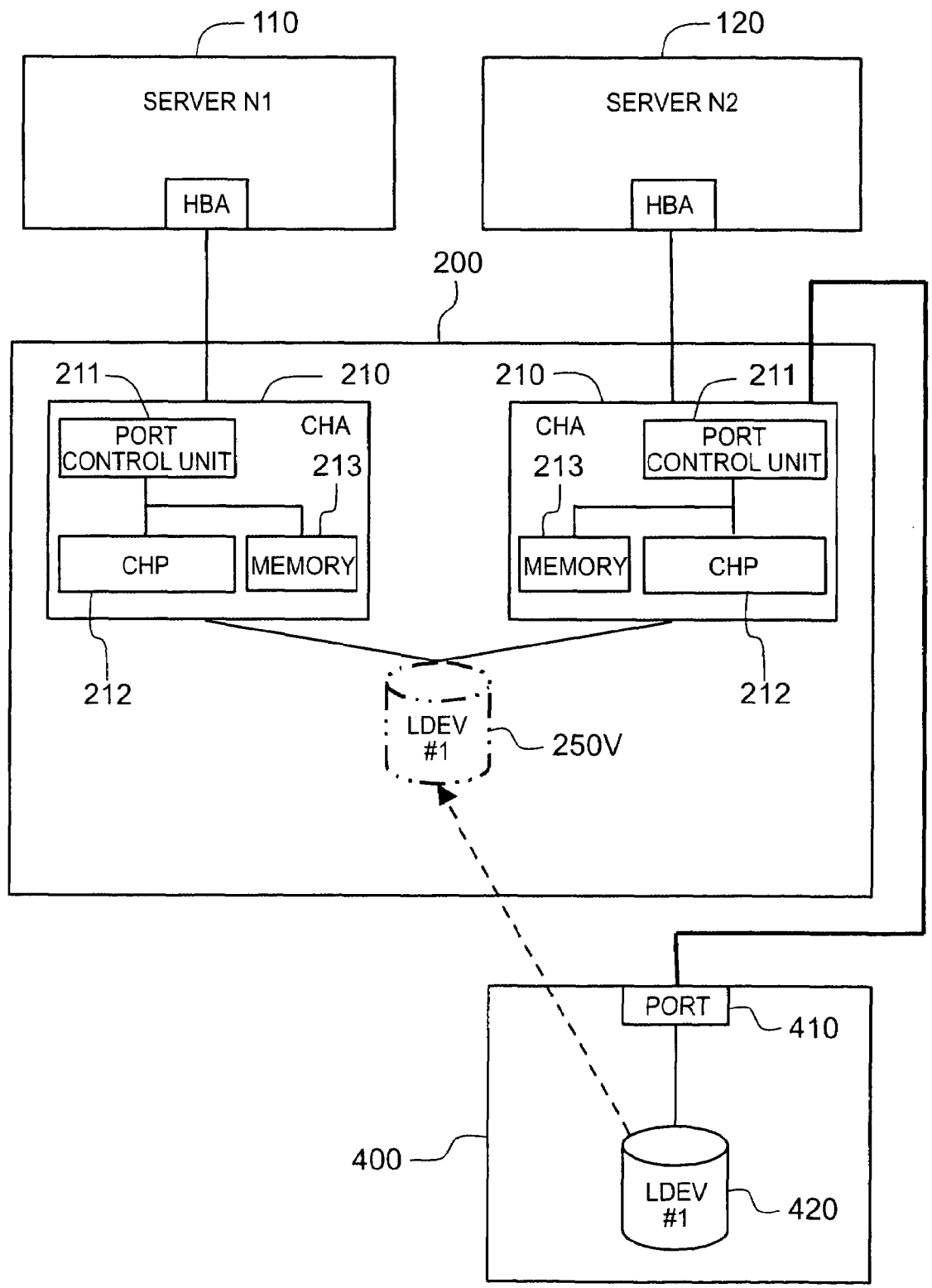
FIG. 20 is block diagram of a disk array device relating to a fifth embodiment example.

A fifth embodiment example of the present invention will now be described based on FIGS. 20 and 21. This embodiment example is equivalent to a modified example of the first embodiment example. This embodiment example is characterized by the fact that the storage resources of an external disk array device are incorporated and used.

The disk array device 200 is connected to another disk array device 400 in an external location via a communication network such as a SAN. This external disk array device 400 comprises a port 410 and LDEV 420.

The external LDEV 420 is mapped to the LUN of the disk array device 200, for example, whereby an LDEV 250V is constructed. That is, the actual body of the LDEV 250V exists in the external disk array device 400. The disk array device 200 acts and behaves as if the LDEV 250V were actually its own storage resource with respect to the servers 110 and 120.

For example, as shown in FIG. 21, because path information for the external volume (LDEV) 420 is contained in port-LUN constitution information T1A, external storage resources can be incorporated within the disk array device 200. Further, the constitution may be such that, instead of directly mapping the external LDEV 420 with the LUN, an intermediate virtual storage layer is added and the external LDEV 420 is mapped to this intermediate storage layer.

This embodiment example also affords the same effects as the first embodiment example does. In addition, this embodiment example is also able to utilize external storage resources effectively and permits the integrated cancellation of reserved states of external storage resources by the disk array device 200.

Moreover, the present invention is not limited to the above embodiments. A person skilled in the art is able to perform a variety of additions and modifications within the scope of the present invention.

What is claimed is:

1. A disk array device, comprising:
an upper-level interface control unit that controls the exchange of data with a plurality of host devices respectively via a communication port;
a lower-level interface control unit that controls the exchange of data with a storage device;
a memory portion that is shared by the upper-level interface control unit and the lower-level interface control unit;
a logical volume provided on the storage device that can be accessed via the communication port;
an exclusive control information storage region that stores exclusive control information for exclusive usage of the logical volume via the communication port by a host device of the plurality of host devices,
wherein the exclusive control information includes an identifier of the logical volume, a reserve state indicator that indicates whether the logical volume is reserved, path information for establishing a reservation, a persistent state indicator that indicates whether the logical volume is reserved via a plurality of preset access paths, path information for establishing a persistent reservation, an access path state indicator that indicates whether to deny usage of an access path when a fault occurs in the access path, path information for an access path state, and a state change indicator that indicates that the reserved state of the logical volume has been cancelled;
an exclusive control unit provided in the upper-level interface control unit that executes exclusive control of the logical volume based on the exclusive control information, wherein the host device has exclusive usage of the logical volume;
a display unit that displays predetermined information relating to the exclusive usage of the logical volume, based on all or part of the exclusive control information,
wherein when the host device undergoes a system shutdown due to the host device being in a fault condition, a user confirms the predetermined information displayed on the display unit, and issues a cancellation instruction to cancel the exclusive usage of the logical volume; and
a cancellation control unit, wherein upon detecting the cancellation instruction, the cancellation unit cancels the exclusive usage of the logical volume by updating the exclusive control information to indicate that the exclusive usage of the logical volume is cancelled,
wherein the host device undergoing the system shutdown is unable to cancel the exclusive usage of the logical volume.

2. The disk array device according to claim 1, wherein the exclusive control information storage region is provided in at least either the memory portion or the upper-level interface control unit.

3. The disk array device according to claim 1, wherein the cancellation control unit is provided in the upper-level interface control unit.

4. The disk array device according to claim 1, further comprising a plurality of the logical volumes, associated with the communication port.

5. The disk array device according to claim 1, further comprising:
 a cancellation target selection unit that supplies the cancellation instruction to the cancellation control unit based on the predetermined information displayed by the display unit.

6. The disk array device according to claim 1, further comprising:
 a priority management information storage region that stores priority management information for managing the priority of each of the host devices; and
 a priority judgment unit,
 wherein when a host device with a relatively low priority is exclusively using the logical volume, the priority judgment unit supplies the cancellation instruction to the cancellation control unit when a host device with a relatively high priority requests access to the logical volume.

7. The disk array device according to claim 1, wherein the cancellation control unit reports a change in the state of the logical volume to each of the host devices when the reserved state of the logical volume is cancelled.

8. The disk array device according to claim 1, wherein the exclusive usage of the logical volume is based on a reservation command issued by the host device.

9. The disk array device according to claim 1, wherein each of the host devices constitutes a failover cluster.

10. The disk array device according to claim 1, wherein the logical volume is provided by another logical volume that an external device comprises.

11. A reservation cancellation control method for a disk array device, the disk array device including an upper-level interface control unit that controls the exchange of data with a plurality of host devices respectively via a communication port, a lower-level interface control unit that controls the exchange of data with a storage device, a memory portion that is shared by the upper-level interface control unit and the lower-level interface control unit, a logical volume provided on the storage device that can be accessed via the communication port, a reservation information storage region that stores reservation management information for the reservation and usage of the logical volume via the communication port by any one of the respective host devices, the method comprising:
 a reserved state display step of displaying the reserved state of the logical volume, based on all or part of the reservation management information, on a display unit;
 a user confirmation step of confirming, by a user, the predetermined information displayed on the display unit, and issuing, by the user, a cancellation instruction to cancel a reserved state of the logical volume when a host device, which has exclusive usage of the logical volume, undergoes a system shutdown due to the host device being in a fault condition;
 a cancellation instruction generation step of detecting the cancellation instruction for the logical volume; and
 a reservation cancellation step of canceling the reserved state of the logical volume, when the cancellation instruction is detected, by updating the reservation management information to indicate that the reserved state of the logical volume is cancelled,
 wherein the reservation management information includes an identifier of the logical volume, a reserve state indicator that indicates whether the logical volume is reserved, path information for establishing a reservation, a persistent state indicator that indicates whether the logical volume is reserved via a plurality of preset access paths, path information for establishing a persistent reservation, an access path state indicator that indicates whether to deny usage of an access path when a fault occurs in the access path, path information for an access path state and a state change indicator that indicates that the reserved state of the logical volume has been cancelled, and
 wherein the host device undergoing the system shutdown is unable to cancel the reserved state of the logical volume.

12. The reservation cancellation control method for a disk array device according to claim 11, wherein a plurality of logical volumes is associated with the communication port.

13. The reservation cancellation control method for a disk array device according to claim 11, further comprising:
 a priority judgment step of determining whether a host device with a relatively high priority has requested access to the logical volume reserved by a host device with a relatively low priority, wherein the priority judgment step is provided prior to the cancellation instruction generation step.

14. The reservation cancellation control method for a disk array device according to claim 11, further comprising:
 a cancellation reporting step of reporting that the reserved state of the logical volume has been cancelled to each of the host devices, wherein the cancellation reporting step is provided after the reservation cancellation step.

15. The reservation cancellation control method for a disk array device according to claim 11, further comprising:
 a setting step, of setting the state change indicator indicating that the reserved state of the logical volume has been cancelled in the reservation management information, wherein the setting step is provided after the reservation cancellation step.

16. The reservation cancellation control method for a disk array device according to claim 15, further comprising:
 a cancellation reporting step, which is performed in response to an inquiry from the respective host devices, of reporting that the reserved state has been cancelled by referencing the state change indicator of the reservation management information, wherein the cancellation reporting step is provided after the setting step.

17. The reservation cancellation control method for a disk array device according to claim 11, wherein each of the host devices constitutes a failover cluster.

18. The reservation cancellation control method for a disk array device according to claim 11, wherein the logical volume is provided by another logical volume that an external device comprises.

19. A storage system, comprising:
 a plurality of servers;
 a disk array device connected to the plurality of servers; a management terminal connected to the disk array device; and
 a display unit,
 wherein the disk array device comprises at least one logical volume and a memory that stores exclusive control information of the at least one logical volume,
 wherein the exclusive control information includes an identifier of the logical volume, a reserve state indicator that indicates whether the logical volume is reserved, path information for establishing a reservation, a persistent state indicator that indicates whether the logical volume is reserved via a plurality of preset access paths, path information for establishing a persistent reservation, an access path state indicator that indicates whether to deny usage of an access path when a fault occurs in the access path, path information for an access path state, and a state change indicator that indicates that the reserved state of the logical volume has been cancelled, wherein a first server of the plurality of servers reserves and uses a logical volume, such that the logical volume is in a reserved state, wherein the display unit displays predetermined information relating to the reserved state of the logical volume, based on all or part of the exclusive control information, and wherein when the first server undergoes a system shutdown due to a fault occurring on the first server, while the logical volume is in the reserved state, a system administrator confirms the predetermined information displayed on the display unit, and issues an instruction to cancel the reserved state of the logical volume via the management terminal.

20. A reservation cancellation control method for a storage system, the storage system comprising a plurality of servers, a disk array device connected to the plurality of servers, a management terminal connected to the disk array device, wherein the disk array device comprises at least one logical volume and a memory that stores exclusive control information of the at least one logical volume, and a display unit, the method comprising:

reserving and using, by a first server of the plurality of servers, a logical volume, such that the logical volume is in a reserved state, wherein the exclusive control information includes an identifier of the logical volume, a reserve state indicator that indicates whether the logical volume is reserved, path information for establishing a reservation, a persistent state indicator that indicates whether the logical volume is reserved via a plurality of preset access paths, path information for establishing a persistent reservation, an access path state indicator that indicates whether to deny usage of an access path when a fault occurs in the access path, path information for an access path state, and a state change indicator that indicates that the reserved state of the logical volume has been cancelled;

displaying on the display unit predetermined information relating to the exclusive control usage of the logical volume, based on all or part of the exclusive control information; and when the first server undergoes a system shutdown due to a fault occurring on the first server, while the logical volume is in the reserved state, confirming, by a system administrator, the predetermined information displayed on the display unit, and issuing, by the system administrator, an instruction to cancel the reserved state of the logical volume via the management terminal.

* * * * *